US010845650B2

(12) United States Patent
Nakano et al.

(10) Patent No.: US 10,845,650 B2
(45) Date of Patent: Nov. 24, 2020

(54) CURVED SURFACE DISPLAY AND ON-VEHICLE DEVICE

(71) Applicant: Panasonic Liquid Crystal Display Co., Ltd., Himeji (JP)

(72) Inventors: Yoshiki Nakano, Hyogo (JP); Akira Isikawa, Hyogo (JP); Masafumi Hirata, Hyogo (JP); Tsutomu Abe, Kanagawa (JP); Naotoshi Sumiya, Kanagawa (JP); Takeshi Aramaki, Kanagawa (JP); Masashi Kuno, Hyogo (JP)

(73) Assignee: Panasonic Liquid Crystal Display Co., Ltd., Hyogo (JP)

(*) Notice: Subject to any disclaimer, the term of this patent is extended or adjusted under 35 U.S.C. 154(b) by 0 days.

(21) Appl. No.: 16/057,338

(22) Filed: Aug. 7, 2018

(65) Prior Publication Data
US 2018/0348557 A1 Dec. 6, 2018

Related U.S. Application Data

(63) Continuation of application No. PCT/JP2017/006594, filed on Feb. 22, 2017.

(30) Foreign Application Priority Data

Mar. 30, 2016 (JP) ................................ 2016-069546

(51) Int. Cl.
*G02F 1/1339* (2006.01)
*G02F 1/1333* (2006.01)

(52) U.S. Cl.
CPC ...... *G02F 1/1339* (2013.01); *G02F 1/133308* (2013.01); *B60K 2370/70* (2019.05);
(Continued)

(58) Field of Classification Search
CPC ..................... G02F 1/1339; B60K 2370/785
See application file for complete search history.

(56) References Cited

U.S. PATENT DOCUMENTS

2007/0281223 A1* 12/2007 Mochizuki ........ G02F 1/133512
430/5
2014/0092356 A1* 4/2014 Ahn ..................... G02F 1/1339
349/153
(Continued)

FOREIGN PATENT DOCUMENTS

JP 2007-272107 10/2007
JP 2007272107 A * 10/2007
(Continued)

OTHER PUBLICATIONS

English translation for JP-2007272107-A, Ukia, Oct. 2007.*
English translation for KR-20160029295-A, Kim, Mar. 2016.*

*Primary Examiner* — Michael H Caley
*Assistant Examiner* — Jonathan Y Jung
(74) *Attorney, Agent, or Firm* — Hamre, Schumann, Mueller & Larson, P.C.

(57) ABSTRACT

A curved surface display comprises: a first substrate that is curved such that a portion located at a center in a first direction is convex or concave toward a display surface side compared with portions located at both ends in the first direction; a second substrate that is curved along the first substrate while disposed opposite the first substrate; and a sealing material that bonds the first substrate and the second substrate together. The sealing material includes a first sealing section extending in a second direction and a second sealing section extending in the first direction. A width of the first sealing section is larger than a width of the second sealing section.

9 Claims, 18 Drawing Sheets

(52) U.S. Cl.
CPC ................... *B60K 2370/785* (2019.05); *G02F 2001/13332* (2013.01)

(56) References Cited

U.S. PATENT DOCUMENTS

| | | | |
|---|---|---|---|
| 2015/0131044 A1* | 5/2015 | Park | G02F 1/1339 349/139 |
| 2015/0168754 A1* | 6/2015 | Im | G02F 1/133753 349/85 |
| 2016/0044751 A1 | 2/2016 | Ikeda et al. | |

FOREIGN PATENT DOCUMENTS

| | | |
|---|---|---|
| JP | 2009-092884 | 4/2009 |
| JP | 2016-038579 | 3/2016 |
| KR | 10-2016-0029295 | 3/2016 |
| KR | 20160029295 A * | 3/2016 |

\* cited by examiner

PLANE STRESS DISTRIBUTION IN TFT GLASS SUBSTRATE (W1=0.8mm)

PLANE STRESS DISTRIBUTION IN CF GLASS SUBSTRATE (W1=0.8mm)
※SHOWING VERTICAL INVERSION STATE

PLANE STRESS DISTRIBUTION IN TFT GLASS SUBSTRATE (W1=3.0mm)

PLANE STRESS DISTRIBUTION IN CF GLASS SUBSTRATE (W1=3.0mm)
※SHOWING VERTICAL INVERSION STATE

CURVED SURFACE DISPLAY AND ON-VEHICLE DEVICE

CROSS-REFERENCE TO RELATED APPLICATION

This application is a bypass continuation of international patent application PCT/JP2017/006594, filed: Feb. 22, 2017 designating the United States of America, the entire disclosure of which is incorporated herein by reference.

TECHNICAL FIELD

The present disclosure relates to a curved surface display and an on-vehicle device including the curved surface display.

BACKGROUND

A liquid crystal curved surface display having a display surface is shown in for example Unexamined Japanese Patent Publication No. 2009-92884. In the curved surface display, each of a pair of substrates (a thin film transistor substrate (TFT substrate) and a color filter substrate (CF substrate)) is curved.

SUMMARY

The inventors have found that light leakage (white floating) is generated near four corners of a display screen in a curved surface display including a display surface having a curved shape, particularly in a transverse electric field system curved surface display represented by an IPS (In-Place-Switching) system. Specifically, for example, in the case that both substrates are formed into the curved shape such that the display surface side becomes convex, compressive stress acts on a glass substrate constituting the TFT substrate, and tensile stress acts on a glass substrate constituting the CF substrate. Consequently, a phase difference is generated in an oblique direction with respect to liquid crystal molecules between the glass substrates. In the transverse electric field system, because the liquid crystal molecules are arranged substantially parallel to both the substrates, light in the oblique direction (polarized light) is further rotated by an influence of the phase difference. As a result, the rotation of the polarized light is not canceled out by the polarizing plate, the light leakage is generated, and the light leakage (white floating) becomes easily visually recognized at the time of black display. The light leakage appears markedly near the four corners on which the stress concentrates in the glass substrate surface.

The present disclosure provides a curved surface display and an on-vehicle device that can reduce the light leakage generated near the four corners of the display screen.

To solve the above problem, a curved surface display according to the present disclosure comprises: a first substrate that is curved such that a portion located at a center in a first direction is convex or concave toward a display surface side compared with portions located at both ends in the first direction; a second substrate that is curved along the first substrate while opposite the first substrate; and a sealing material that bonds the first substrate and the second substrate together. The sealing material includes a first sealing section extending in a second direction cross to the first direction and a second sealing section extending in the first direction, and a dimension in the first direction of the first sealing section is larger than a dimension in the second direction of the second sealing section.

A first on-vehicle device according to the present disclosure comprises: the curved surface display explained above; and a main body component that attaches the curved surface display to a vehicle, the main body component including a frame body disposed at a peripheral edge of the curved surface display. The frame body of the main body component includes a first frame edge located corresponding to the first sealing section at the peripheral edge of the curved surface display and a second frame edge located corresponding to the second sealing section at the peripheral edge of the curved surface display. The second frame edge includes a first bending region that is curved in the first direction so as to protrude in a direction identical to the first substrate of the curved surface display.

A second on-vehicle device according to the present disclosure comprises: a curved surface display; and a main body component that attaches the curved surface display to a vehicle, the main body component including a frame body disposed at a peripheral edge of the curved surface display. The curved surface display includes: a first substrate that is curved such that a portion located at a center in a first direction is convex or concave toward a display surface side compared with portions located at both ends in the first direction; a second substrate that is curved along the first substrate while disposed opposite the first substrate; and a sealing material that bonds the first substrate and the second substrate together. The sealing material includes a first sealing section extending in a second direction orthogonal to the first direction and a second sealing section extending in the first direction. A dimension in the first direction of the first sealing section is larger than a dimension in the second direction of the second sealing section. The frame body of the main body component includes a first frame edge located corresponding to the first sealing section at the peripheral edge of the curved surface display and a second frame edge located corresponding to the second sealing section at the peripheral edge of the curved surface display. The second frame edge overlaps the second sealing section in planar view.

A third on-vehicle device according to the present disclosure comprises: a curved surface display; and a main body component that attaches the curved surface display to a vehicle, the main body component including a frame body disposed at a peripheral edge of the curved surface display. The curved surface display includes: a first substrate that is curved such that a portion located at a center in a first direction is convex or concave toward a display surface side compared with portions located at both ends in the first direction; a second substrate that is curved along the first substrate while disposed opposite the first substrate; and a sealing material that bonds the first substrate and the second substrate together. The sealing material includes a first sealing section extending in a second direction orthogonal to the first direction and a second sealing section extending in the first direction. A dimension in the first direction of the first sealing section is larger than a dimension in the second direction of the second sealing section. The frame body of the main body component includes a first frame edge located corresponding to the first sealing section at the peripheral edge of the curved surface display and a second frame edge located corresponding to the second sealing section at the peripheral edge of the curved surface display, and the first frame edge overlaps the first sealing section in planar view.

In the curved surface display according to the present disclosure, the dimension in the first direction of the first sealing section may be 1.1 to 5.0 times the dimension in the second direction of the second sealing section.

DETAILED DESCRIPTION

Hereinafter, an exemplary embodiment of the present disclosure will be described with reference to the drawings.

Figure 1:
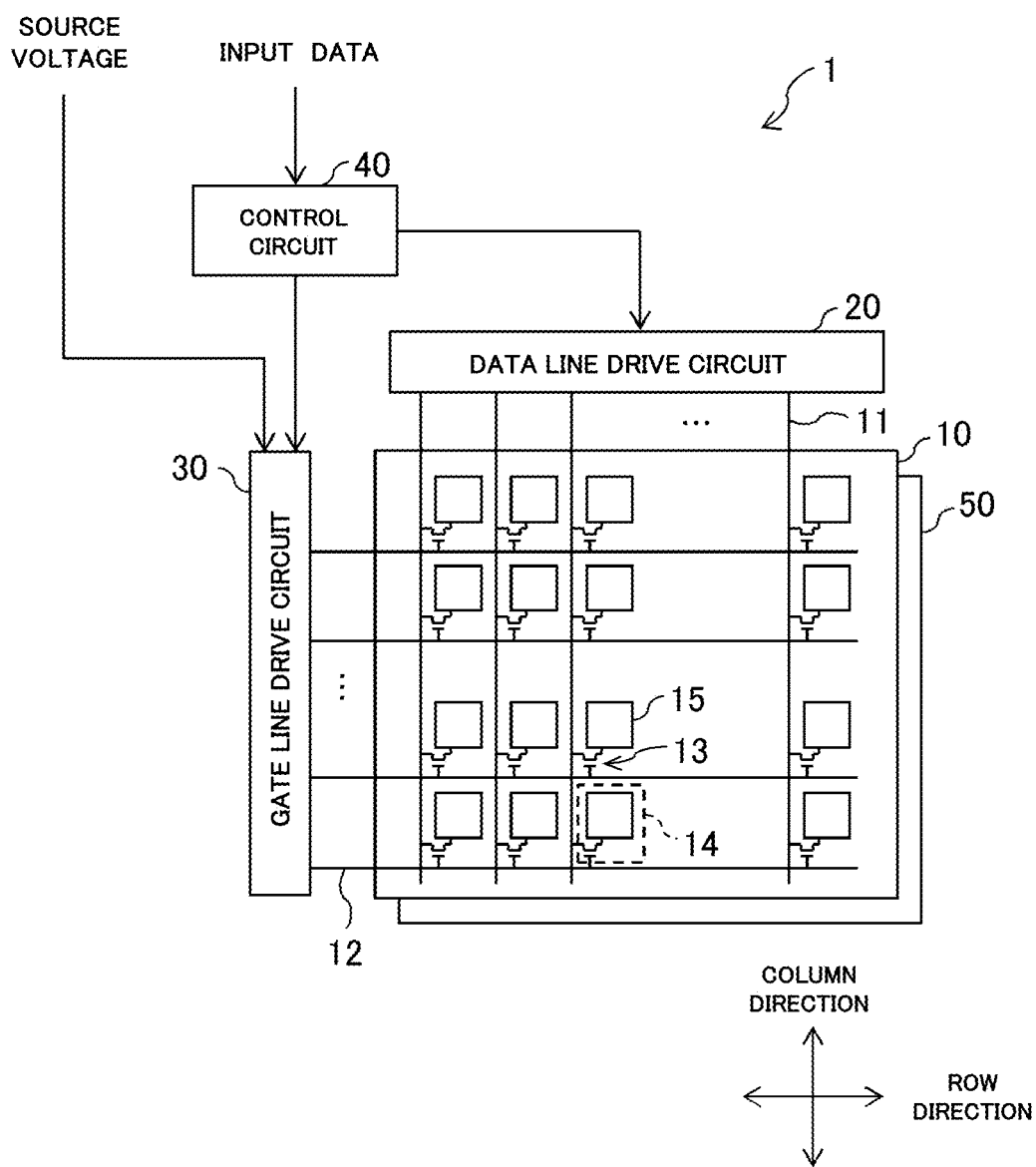
FIG. 1 is a view schematically illustrating an overall configuration of a curved surface display according to an exemplary embodiment.

FIG. 1 is a view illustrating a schematic configuration of a curved surface display according to an exemplary embodiment. Curved surface display (hereinafter Curved display) 1 includes display panel 10 that displays an image, a driving circuit (such as data line driving circuit 20 and gate line driving circuit 30) that drives display panel 10, control circuit 40 that controls the driving circuit, and backlight device 50 that irradiates display panel 10 with light from a rear surface side. The driving circuit may be provided in display panel 10. Curved display 1 has a curved external form in which a display surface side is formed into a convex shape while a rear surface side is formed into a concave shape, or has a curved external form in which the display surface side is formed into the concave shape while the rear surface side is formed into the convex shape. In curved display 1 of the former, a tensile stress is applied to glass substrate constituting a thin film transistor substrate (TFT substrate), and a compressive stress is applied to glass substrate constituting a color filter substrate (CF substrate). In curved display 1 of the latter, the compressive stress is applied to glass substrate constituting TFT substrate, and the tensile stress is applied to glass substrate constituting CF substrate.

Referring to FIG. 1, a plurality of data lines 11 extending in a column direction and a plurality of gate lines 12 extending in a row direction are provided in display panel 10. Thin film transistor (TFT) 13 is provided in an intersection portion of each data line 11 and each gate line 12. Each data line 11 and each gate line 12 are formed into a curved shape (convex shape) according to a bending direction of curved display 1. As used herein, the bending direction means a direction parallel to the display surface, and for example the row direction or the column direction. For example, in the case where the bending direction is the row direction (see FIG. 5), data line 11 is formed into a linear shape while gate line 12 is formed into the curved shape. In the case where the bending direction is the column direction (see FIG. 6 described below), data line 11 is formed into the curved shape while gate line 12 is formed into the linear shape.

In display panel 10, a plurality of pixels 14 are arranged into a matrix shape (in the row and column directions) according to intersection portions of data lines 11 and gate lines 12. Although described in detail later, display panel 10 includes a TFT substrate (thin film transistor substrate), a CF substrate (color filter substrate), and a liquid crystal layer disposed therebetween. A plurality of pixel electrodes 15 each of which is provided according to each pixel 14 and one common electrode 16 shared by a plurality of pixels 14 are provided in TFT substrate. Common electrode 16 may be disposed in each one or common to a plurality of pixels 14.

Specifically, based on input data (such as a synchronous signal and a video signal) input from an outside, control circuit 40 outputs various control signals controlling timing of driving data line driving circuit 20 and gate line driving circuit 30, and image data corresponding to an image displayed in a display area of display panel 10.

Data line driving circuit 20 outputs a data signal (data voltage) to each data line 11 based on the control signal and the image data, which are input from control circuit 40.

Based on an externally-input power supply voltage and the control signal input from control circuit 40, gate line driving circuit 30 generates a gate signal (gate voltage), and outputs the gate signal to each gate line 12.

Figure 2:
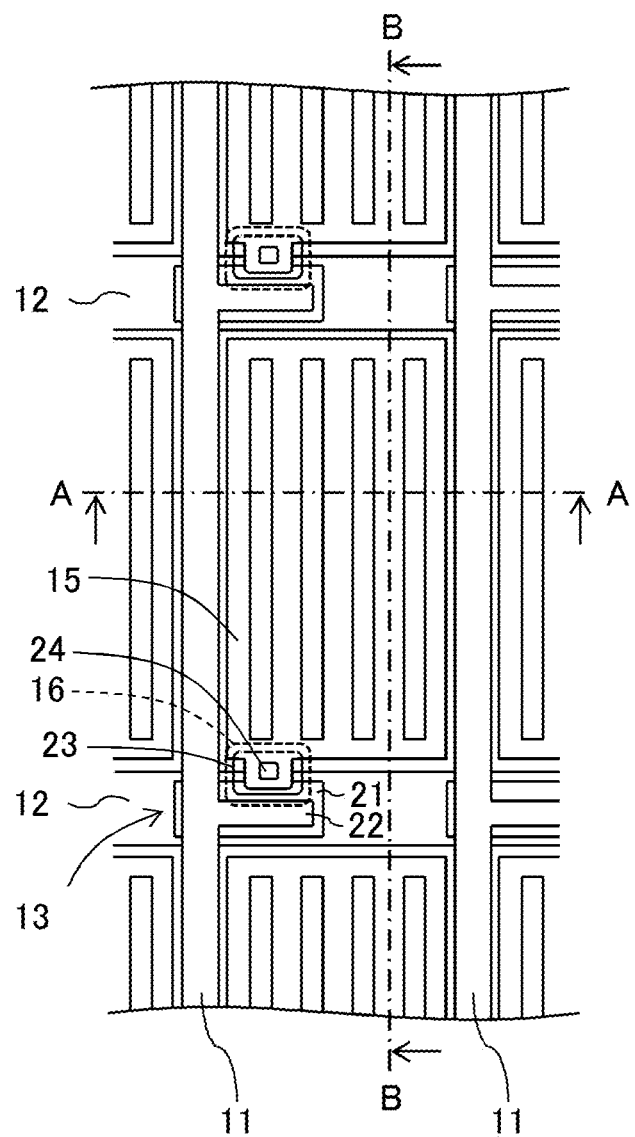
FIG. 2 is a plan view illustrating a configuration example of a pixel in a display panel of the exemplary embodiment.
Figure 2:
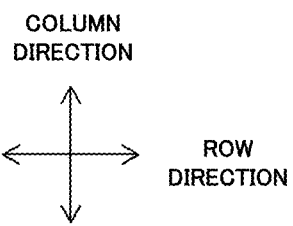
Figure 3:
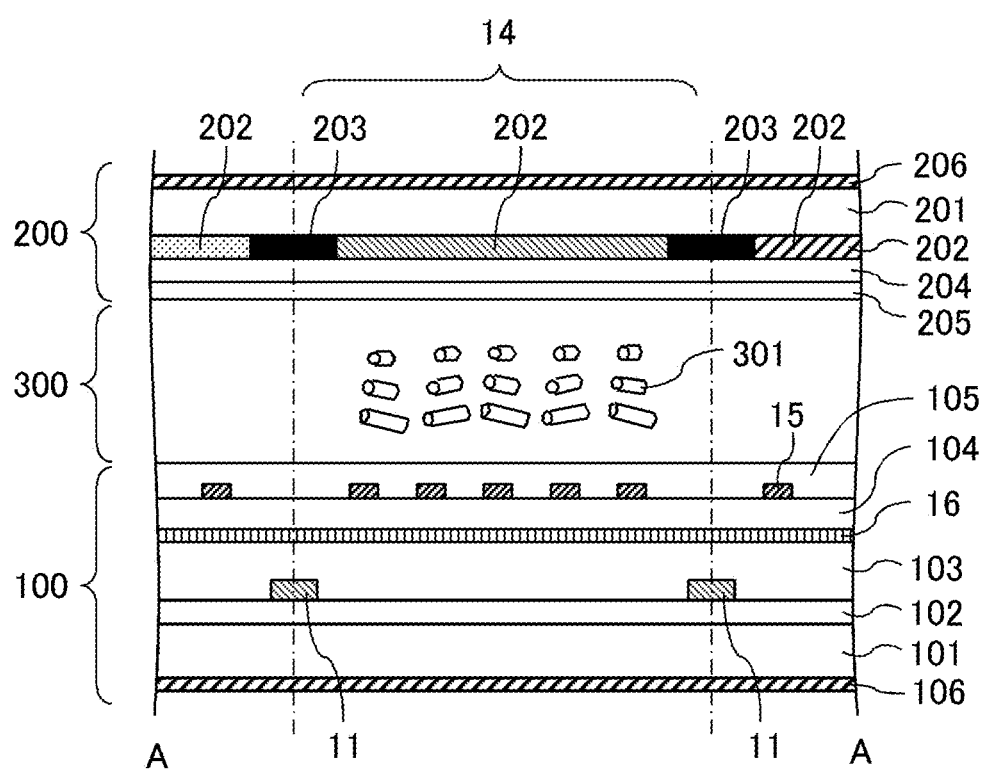
FIG. 3 is a sectional view taken along a line A-A in FIG. 2.
Figure 4:
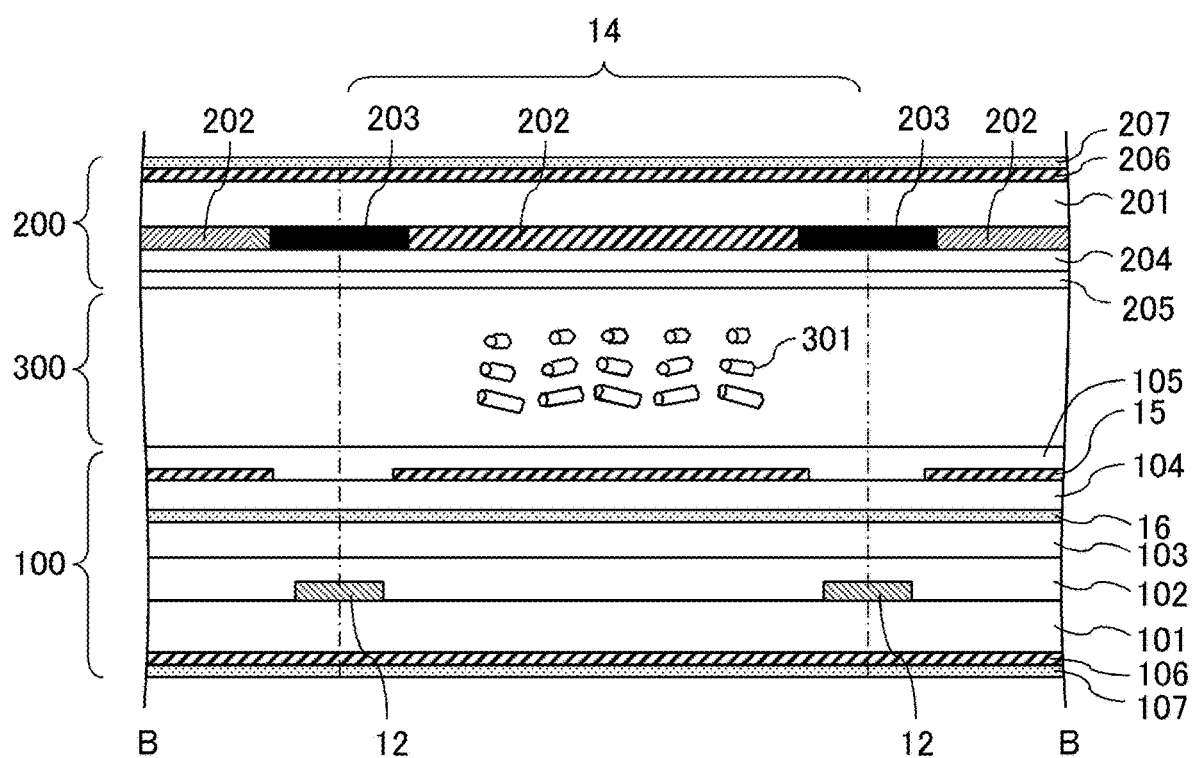
FIG. 4 is a sectional view taken along a line B-B in FIG. 2.

FIG. 2 is a plan view illustrating a configuration example of pixel 14 of display panel 10. FIG. 3 is a sectional view taken along line A-A in FIG. 2, and FIG. 4 is a sectional view taken along line B-B in FIG. 2. A specific configuration of pixel 14 will be described below with reference to FIGS. 2 to 4.

Referring to FIG. 2, an area partitioned by two adjacent data lines 11 and two adjacent gate lines 12 corresponds to one pixel 14. Thin film transistor 13 is provided in a plurality of pixels 14 respectively. Thin film transistor 13 includes semiconductor layer 21 formed on insulator 102 (see FIG. 3) and drain electrode 22 and source electrode 23, which are formed on semiconductor layer 21 (see FIG. 2). Drain electrode 22 is electrically connected to data line 11, and source electrode 23 is electrically connected to pixel electrode 15 via through-hole 24.

Pixel electrode 15 including a transparent conductive film such as Indium Tin Oxide (ITO) is formed in each pixel 14. Pixel electrode 15 includes a plurality of openings (slit), and is formed into a stripe shape. There is no limitation to a shape of an opening. one common electrode 16 made of a transparent conductive film such as ITO is formed over the whole display area. One common electrode 16 is common to a plurality of pixels 14. An opening (corresponding to a dotted-line box in FIG. 2) is formed to electrically connect pixel electrode 15 and source electrode 23 to each other in an area where common electrode 16 overlaps through-hole 24 and source electrode 23 of thin film transistor 13.

As illustrated in FIG. 3, display panel 10 includes TFT substrate 100, CF substrate 200, and liquid crystal layer 300 sandwiched between TFT substrate 100 and CF substrate 200.

In TFT substrate 100, gate line 12 (see FIG. 4) is formed on glass substrate 101, and insulator 102 is formed so as to cover gate line 12. Data line 11 (see FIG. 3) is formed on insulator 102, and insulator 103 is formed so as to cover data line 11. Common electrode 16 is formed on insulator 103, and insulator 104 is formed so as to cover common electrode 16. Pixel electrode 15 is formed on insulator 104, and alignment film 105 is formed so as to cover pixel electrode 15. In glass substrate 101, polarizing plate 106 is bonded to a surface (rear surface) of a glass substrate, the surface facing a backlight device 50 (a side opposite to a liquid crystal layer 300 side).

Colored components 202 and black matrix 203 are formed on glass substrate 201 of CF substrate 200. Overcoat layer 204 is formed so as to cover Colored components 202 and black matrix 203. Alignment film 205 is formed on overcoat layer 204. In glass substrate 201, polarizing plate 206 is bonded to a face (surface) on a display surface side (the side opposite to the liquid crystal layer 300 side). The laminated structure of each part constituting pixel 14 is not limited to the structure in FIGS. 3 and 4, but a known structure can be applied.

Liquid crystal 301 is sealed in liquid crystal layer 300. Liquid crystal 301 may be a negative liquid crystal having a negative dielectric anisotropy or a positive liquid crystal having a positive dielectric anisotropy. Alignment film 105, 205 may be an alignment film subjected to a rubbing alignment process or a light alignment film subjected to a light alignment process.

Thus, curved display 1 has a configuration of a crosswise field scheme in which an electric field substantially parallel to TFT substrate 100 and CF substrate 200 is applied to liquid crystal layer 300. For example, curved display 1 has a configuration of an IPS (In-Plane Switching) scheme. Curved display 1 is not limited to the crosswise field scheme. For example, curved display 1 may have a configuration of a VA (Vertical Alignment) scheme.

A method for driving curved display 1 will briefly be described below. A scanning gate voltage (gate-on voltage, gate-off voltage) is supplied from gate line driving circuit 30 to gate line 12. A video data voltage is supplied from data line driving circuit 20 to data line 11. When the gate-on voltage is supplied to gate line 12, thin film transistor 13 is put into an on state, and the data voltage supplied to data line 11 is transmitted to pixel electrode 15 through drain electrode 22 and source electrode 23. A common voltage (Vcom) is supplied from common electrode driving circuit (not illustrated) to common electrode 16. Common electrode 16 overlaps pixel electrode 15 with insulator 104 interposed therebetween, and an opening (slit) is formed in pixel electrode 15. Therefore, liquid crystal 301 is driven by an electric field from pixel electrode 15 to common electrode 16 through liquid crystal layer 300 and the opening of pixel electrode 15. Liquid crystal 301 is driven to control transmittance of light transmitted through liquid crystal layer 300, thereby displaying the image. In order to display a colored image, red colored components, green colored components and blue colored components which are color filters having a stripe shape are provided in accordance with pixels 14, and desired data voltage is applied to data line 11 connected to corresponding pixel electrode 15 of pixel 14. The method for driving curved display 1 is not limited to the above method, but a known method can be adopted.

Figure 5:
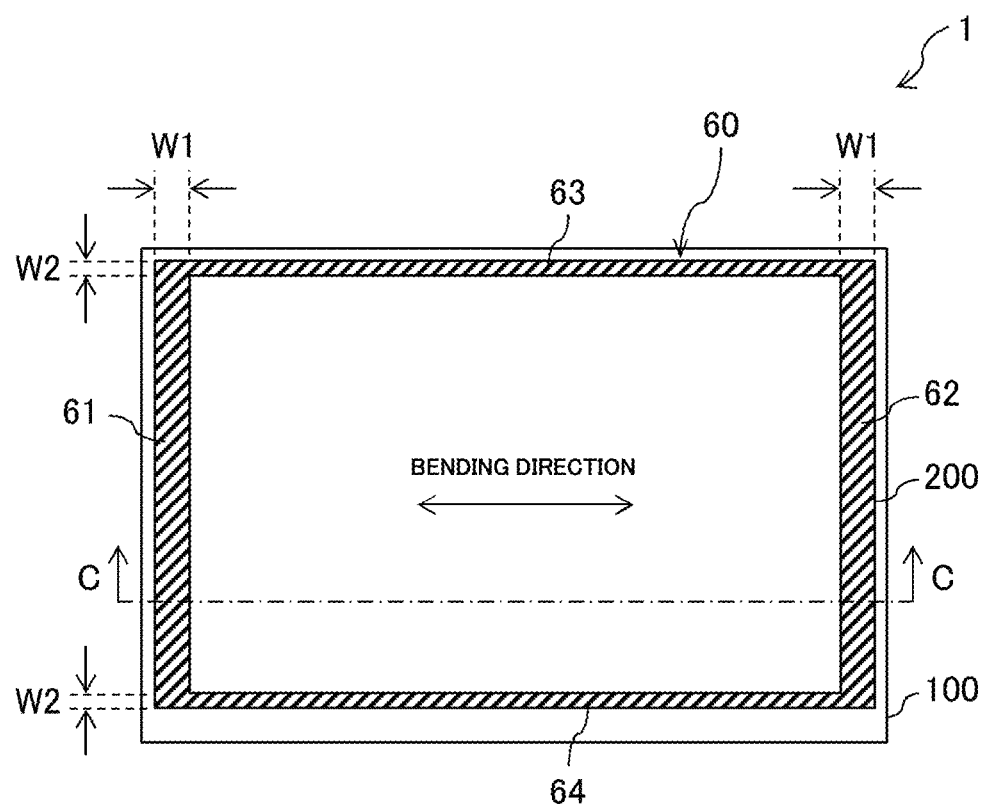
FIG. 5 is a plan view illustrating a configuration of the curved surface display of the exemplary embodiment.

FIG. 5 is a plan view illustrating a schematic configuration of curved display 1. In FIG. 5, TFT substrate 100, CF substrate 200, and sealing material 60 bonding the substrates are illustrated, and other components are omitted. Sealing material 60 is formed into a frame shape so as to surround a periphery of a display region where an image is displayed. For example, sealing material 60 is made of a photosetting resin material, and cured by irradiating sealing material 60 with light (e.g., ultraviolet ray). Sealing material 60 is cured while interposed between TFT substrate 100 and CF substrate 200, whereby TFT substrate 100 and CF substrate 200 are bonded and fixed. Liquid crystal is injected and sealed between TFT substrate 100 and CF substrate 200 on the inside of sealing material 60. An opening injecting liquid crystal in the sealing material 60 may be provided in sealing material 60.

Figure 6:
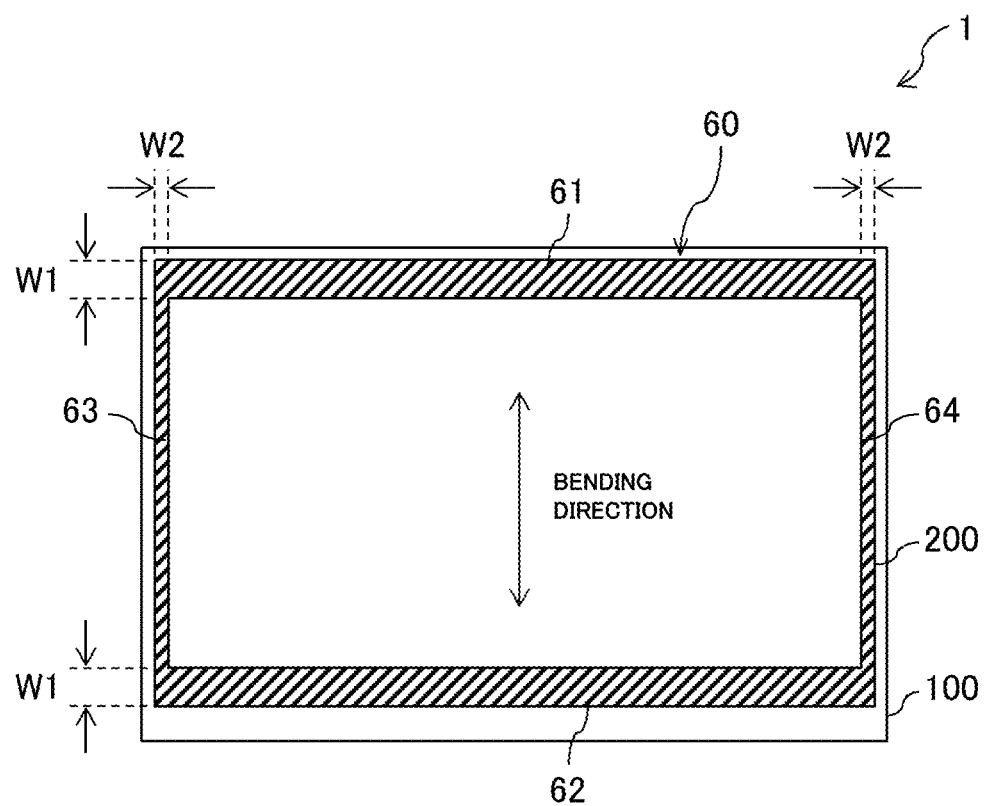
FIG. 6 is a plan view illustrating another configuration of the curved surface display of the exemplary embodiment.

Specifically, as illustrated in FIG. 5, sealing material 60 includes first sealing section 61 and third sealing section 62 that extend in a direction orthogonal to a bending direction of curved display 1 and second sealing section 63 and fourth sealing section 64 that extend in a direction parallel to the bending direction of curved display 1, and sealing material 60 is formed into a frame shape. Dimension W1 in the bending portion of first sealing section 61 and third sealing section 62 (i.e. widths W1) are larger than dimension W1 in the direction orthogonal to the bending portion of second sealing section 63 and fourth sealing section 64 (i.e. widths W2). The bending direction of curved display 1 may be a row direction as illustrated in FIG. 5 or a column direction as illustrated in FIG. 6. Width W1 of first sealing section 61 and width W1 of third sealing section 62 may be identical to or different from each other. Width W2 of second sealing section 63 and width W2 of fourth sealing section 64 may be identical to or different from each other.

Figure 7:
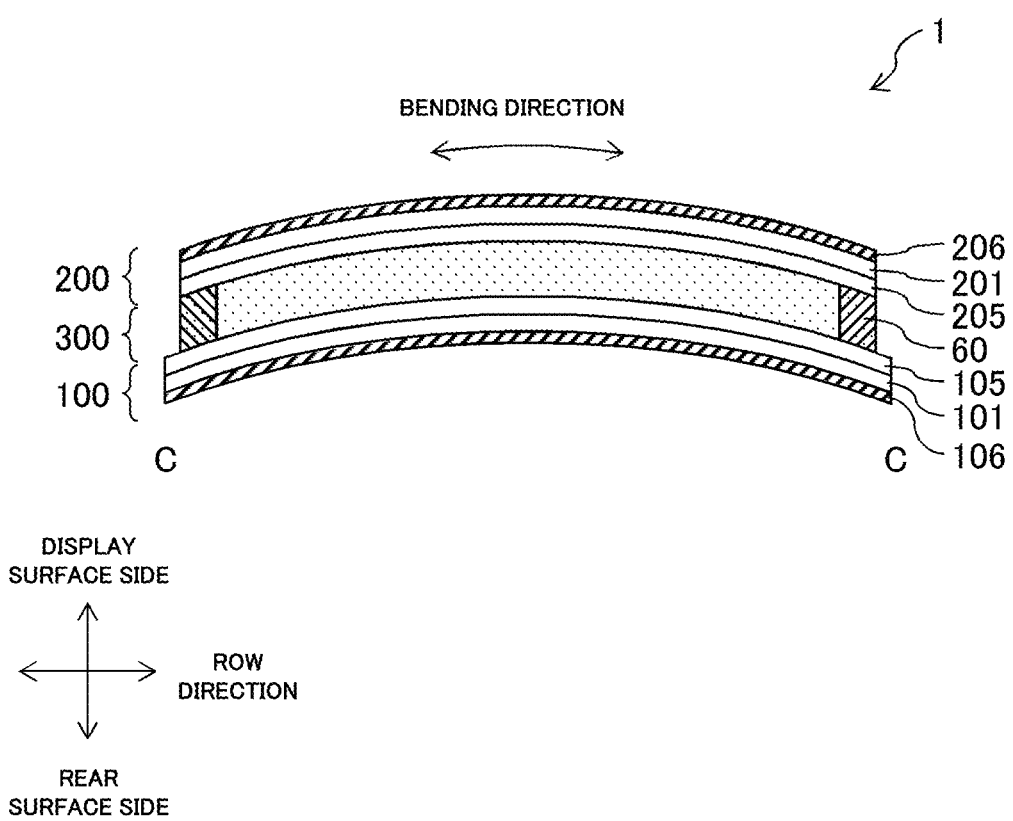
FIG. 7 is a sectional view taken along a line C-C in FIG. 5.

FIG. 7 is a sectional view taken along a line C-C of curved display 1 in FIG. 5. Curved display 1 in FIG. 7 has a convex shape on the display surface side, and has a curved outer shape bent in the row direction (first direction). That is, in curved display 1, a portion located in a center in the first direction becomes convex toward the display surface side compared with portions located at both ends in the first direction. For example, curved display 1 has a curvature center on a rear surface side and a shape with a curvature radius of 500 mm. Curved display 1 may have the curved outer shape that is curved such that the rear surface side becomes convex. A specific numerical value of the curvature radius is not limited. For example, sealing material 60 is disposed between alignment film 105 of TFT substrate 100 and alignment film 205 of CF substrate 200.

Results of verification of the light leakage generated near the four corners of the display screen will be described below.

Figure 8A:
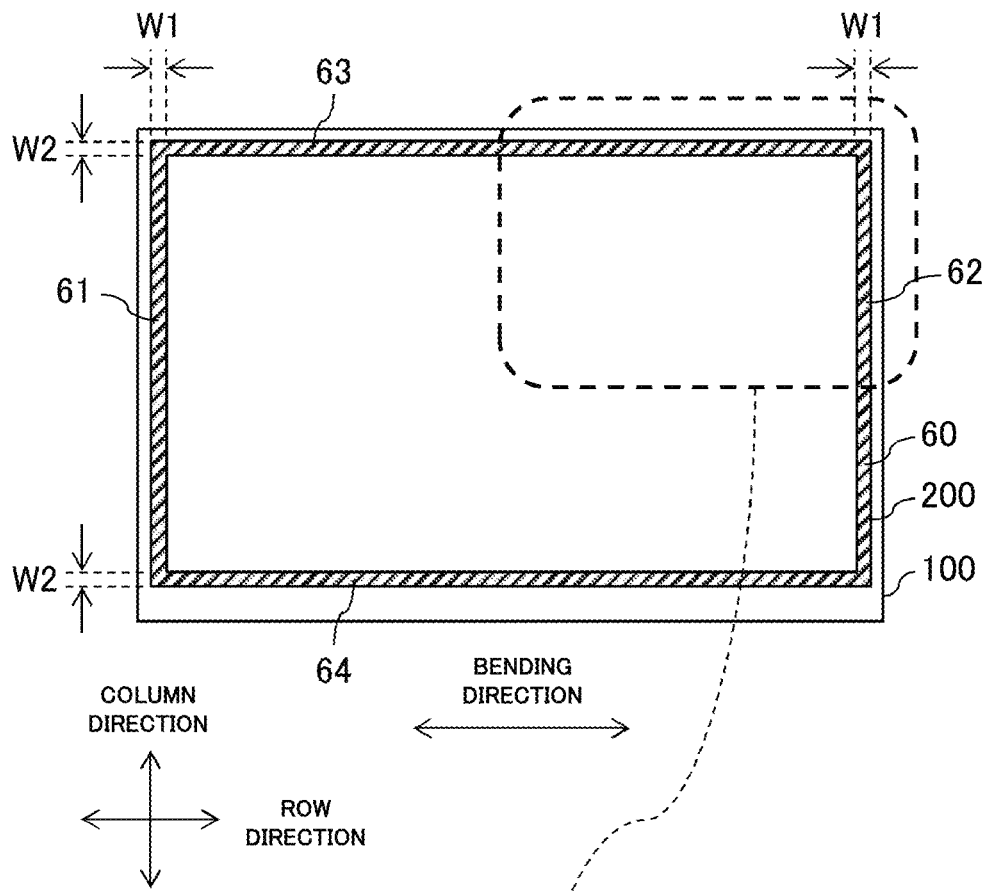
FIGS. 8A and 8B are a view illustrating a light transmittance distribution in a curved surface display according to a comparative example.
Figure 8B:
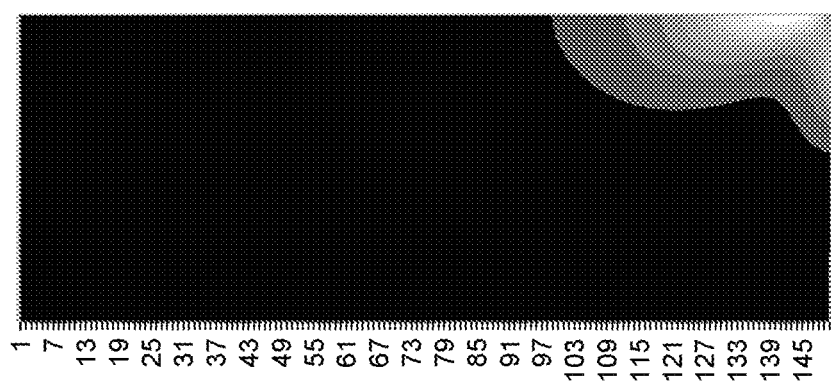

FIG. 8 illustrates a light transmittance distribution in the case that widths W1 of first sealing section 61 and third sealing section 62 are identical to widths W2 of second sealing section 63 and fourth sealing section 64 in a curved display according to a comparative example. FIG. 8B illustrates a result that the light transmittance was measured in a region from the center of the display screen to the upper right of the display screen in the curved display that was bent in the row direction while the curvature radius was set to 500 mm, the width of sealing material 60 being W1=W2=0.8 mm. As can be seen from FIG. 8B, the transmittance becomes high in a peripheral region around 141 mm from the center of the display screen as a peak. A peak value of the transmittance was 0.002568, and the region where the transmittance was greater than or equal to 0.0005 was 144 mm². That is, it found that a large amount of light leakage is generated in the above region.

Figure 9A:
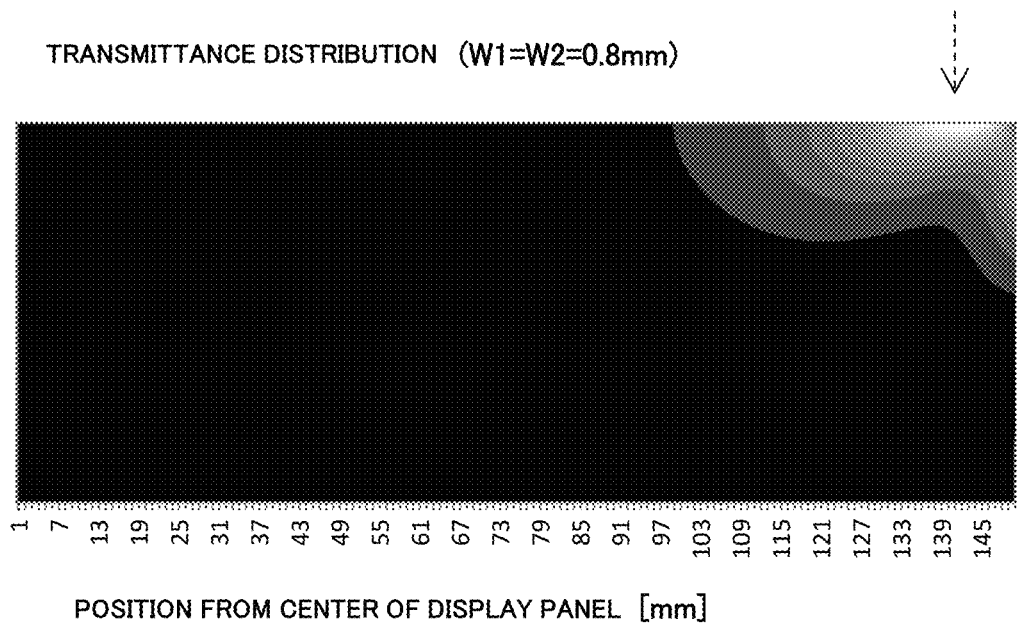
FIGS. 9A and 9B are a graph illustrating a measurement result of a T/C misalignment amount in the curved surface display of the comparative example.
Figure 9B:
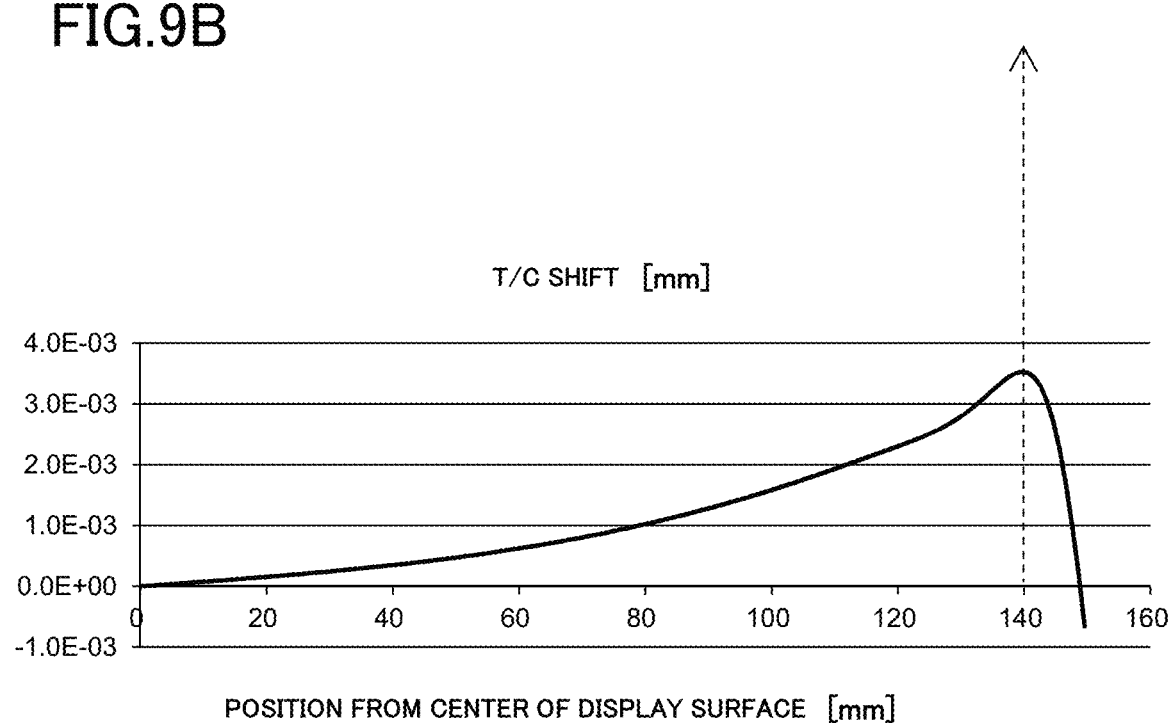
Figure 10A:
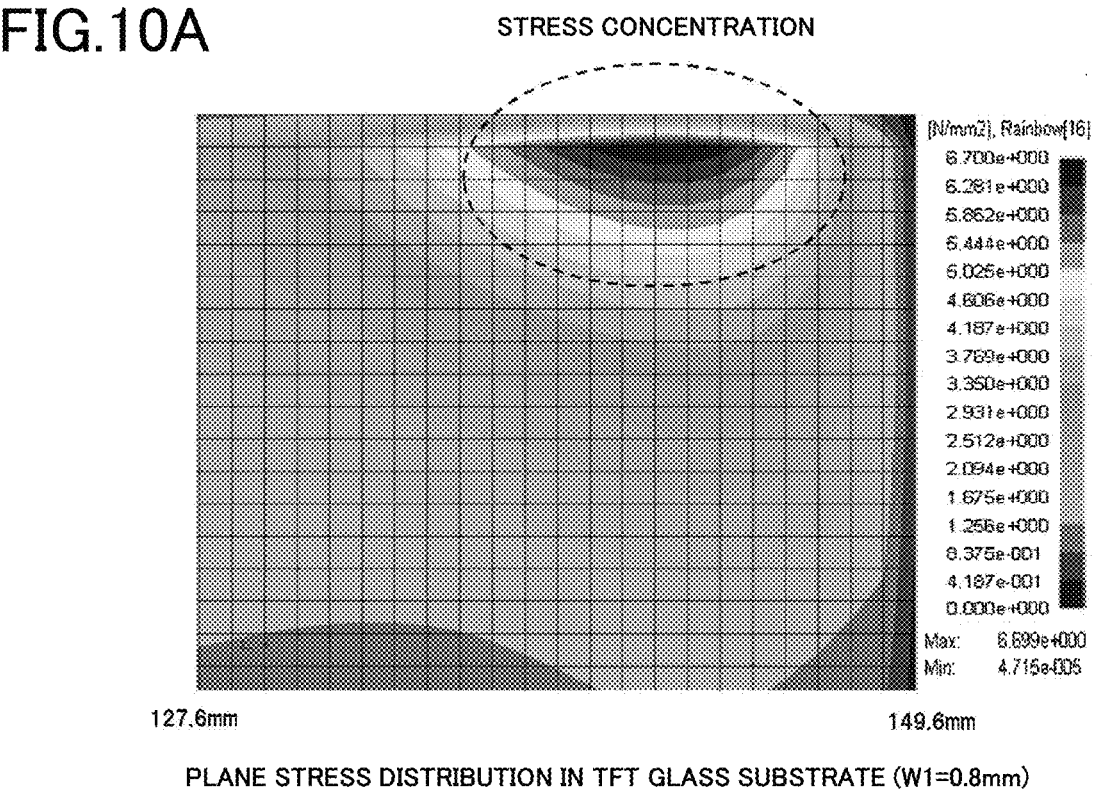
FIGS. 10A and 10B are a view illustrating a stress distribution in an XY plane of a glass substrate constituting the curved surface display of the comparative example.
Figure 10B:
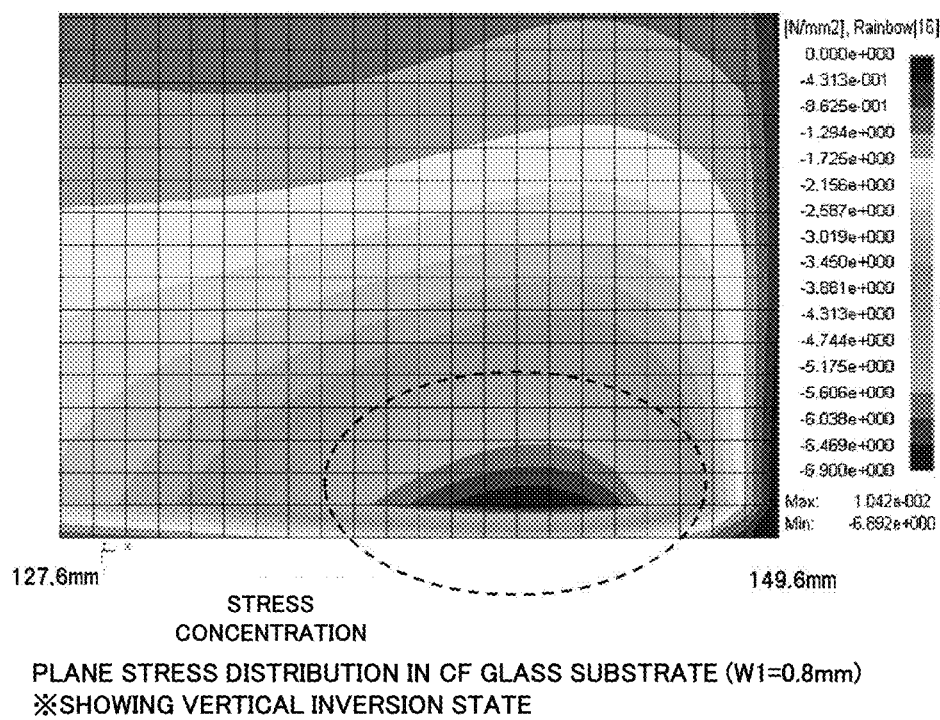

FIG. 9B is a graph illustrating a measurement result of the misalignment amount (T/C misalignment amount) between the TFT substrate and the CF substrate when the curved display of the comparative example is bent. As illustrated in FIGS. 9A and 9B, it is found that the T/C misalignment amount is large in the region where the transmittance (light leakage amount) is high. FIGS. 10A and 10B are views illustrating a stress distribution in an XY plane of the TFT glass substrate and CF glass substrate constituting the curved display of the comparative example. As illustrated in FIGS. 10A and 10B, it is found that the stress is large in the region where the transmittance (light leakage amount) is high while the T/C misalignment amount is large. Because the stress is increased in the region having the large T/C misalignment amount, it is presumed that a difference in birefringence is generated in the substrate to increase the transmittance (light leakage amount) in the region.

Figure 11A:
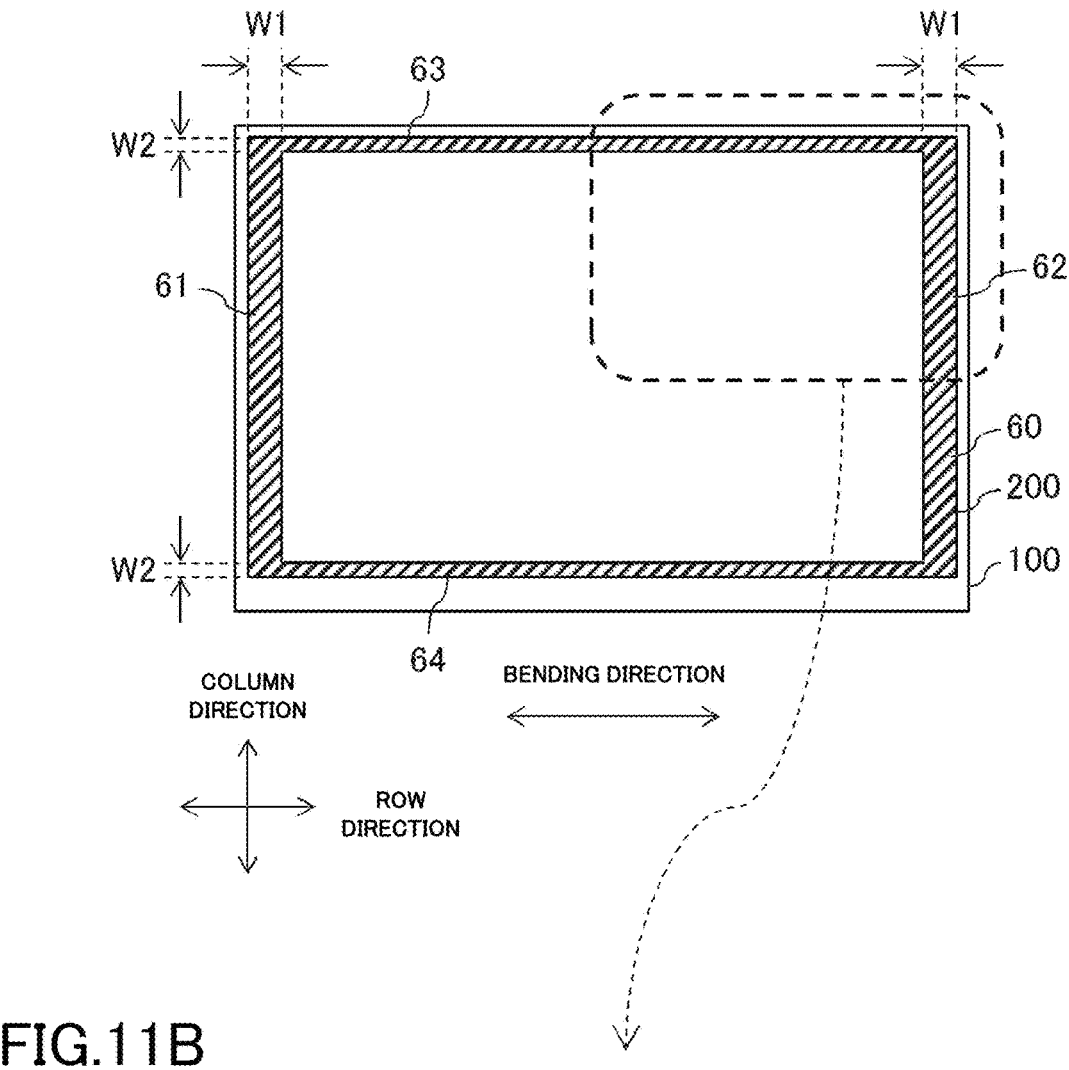
FIGS. 11A and 11B are a view illustrating the light transmittance distribution in the curved surface display of the exemplary embodiment.
Figure 11B:
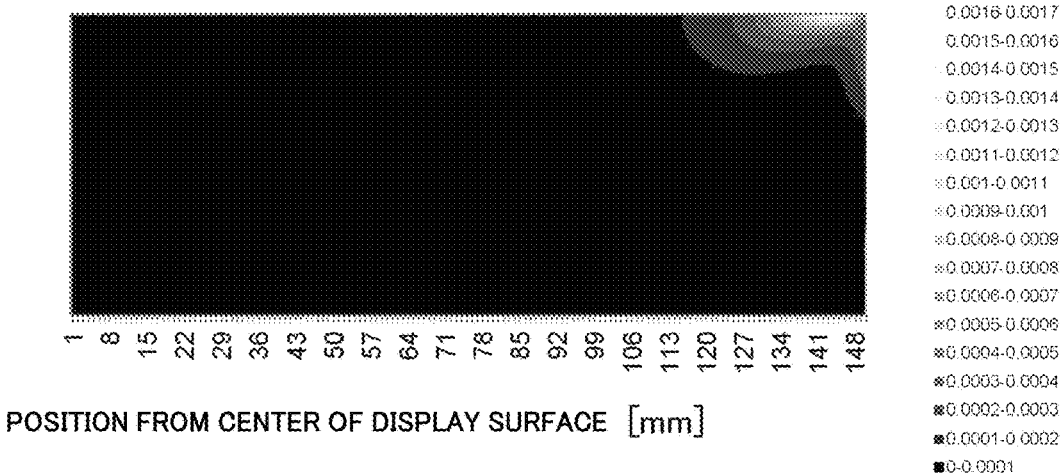

FIG. 11 illustrates the light transmittance distribution in the case that widths W1 of first sealing section 61 and third sealing section 62 are larger than widths W2 of second sealing section 63 and fourth sealing section 64 in curved display 1 of the exemplary embodiment. FIG. 11B illustrates the result that the light transmittance was measured in the region from the center of the display screen to the upper right of the display screen in curved display 1 that was bent in the row direction while the curvature radius was set to 500 mm, widths W1 of first seal unit 61 and third seal unit 62 being set to 3.0 mm, widths W2 of second seal unit 63 and fourth seal unit 64 being set to 0.8 mm. At this point, the peak value of the transmittance was 0.001702, and the region where the transmittance was greater than or equal to 0.0005 was 51 mm². As illustrated in FIG. 11B, it is found that in the vicinity of 141 mm from the center of the curved display screen, the transmittance is lower than that of the curved display of the comparative example (FIG. 8B). That is, it is found that the light leakage amount is decreased in the above region.

Figure 12:
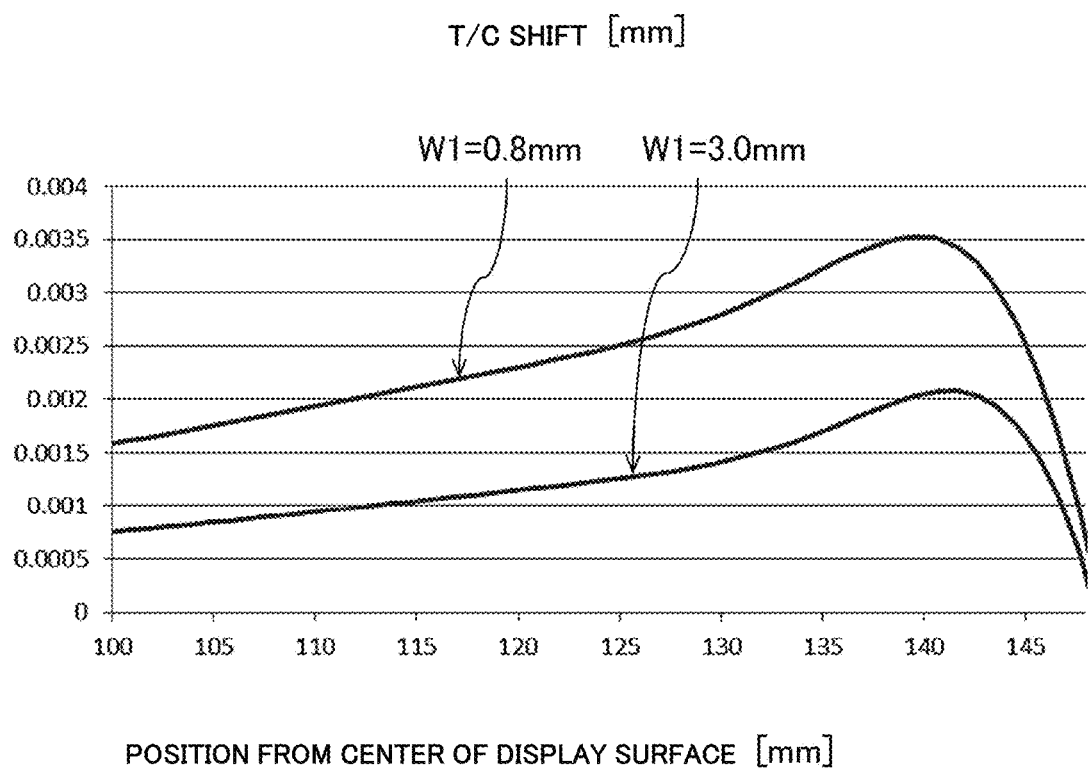
FIG. 12 is a graph illustrating comparison of the T/C misalignment amount between the curved surface display of the exemplary embodiment and the curved surface display of the comparative example.
Figure 13A:
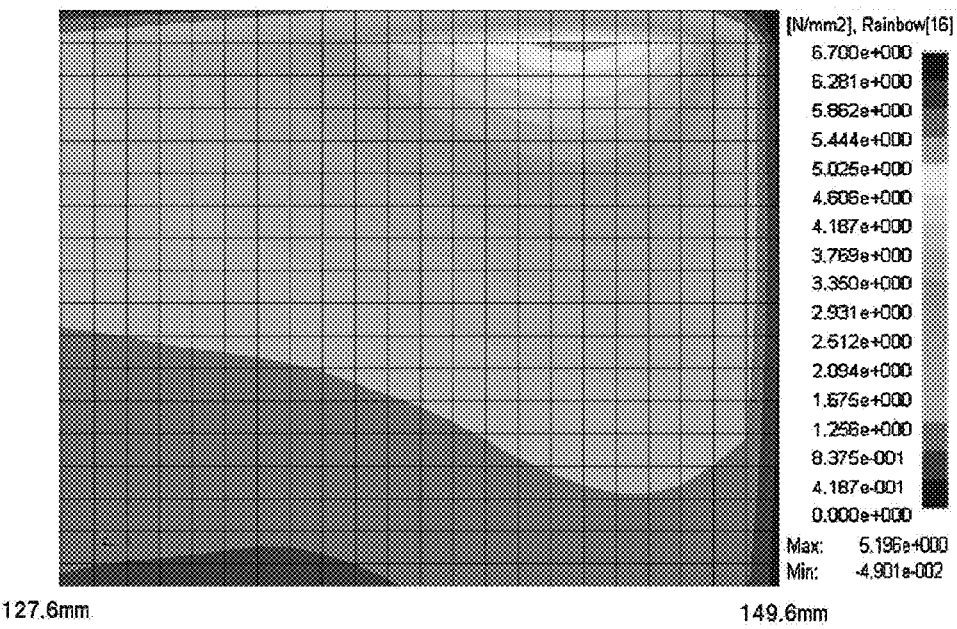
FIGS. 13A and 13B are a view illustrating the stress distribution in the XY plane of the glass substrate constituting the curved surface display of the exemplary embodiment.
Figure 13B:
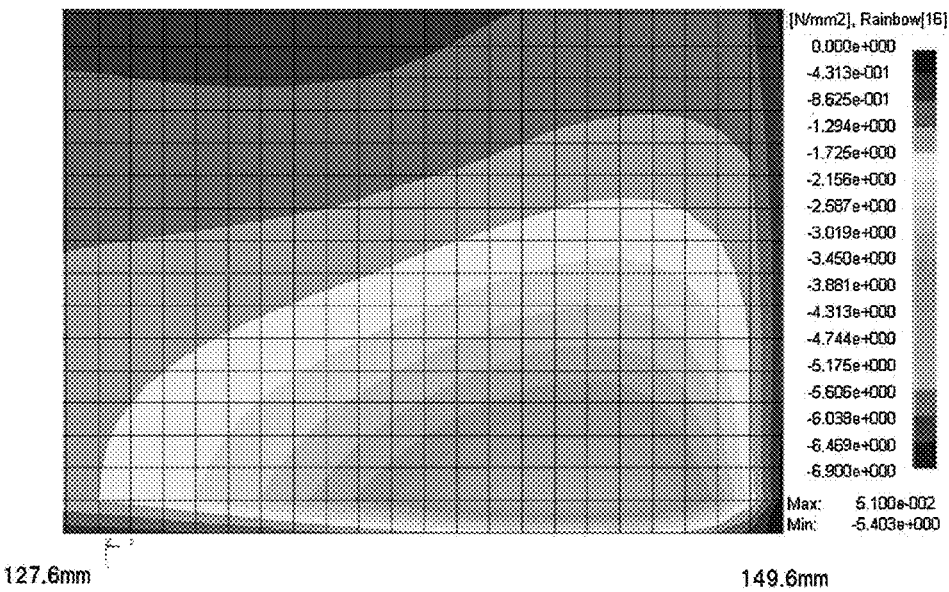

FIG. 12 is a graph illustrating comparison of the T/C misalignment amount between the case (the curved display of the comparative example) that widths W1 of first sealing section 61 and third sealing section 62 are set to 0.8 mm and the case of 3.0 mm (curved display 1 of the exemplary embodiment). As illustrated in FIG. 12, it is found that the T/C misalignment amount of the case of 3.0 mm is smaller that of the case of 0.8 mm in the whole region of the substrate. FIGS. 13A and 13B are views illustrating a stress distribution in an XY plane of the TFT glass substrate and CF glass substrate constituting curved display 1 of the exemplary example. As illustrated in FIGS. 13A and 13B, it is found that the stress of W1=3.0 mm is smaller than that of W1=0.8 mm (the curved display of the comparative example) (see FIG. 10).

Figure 14:
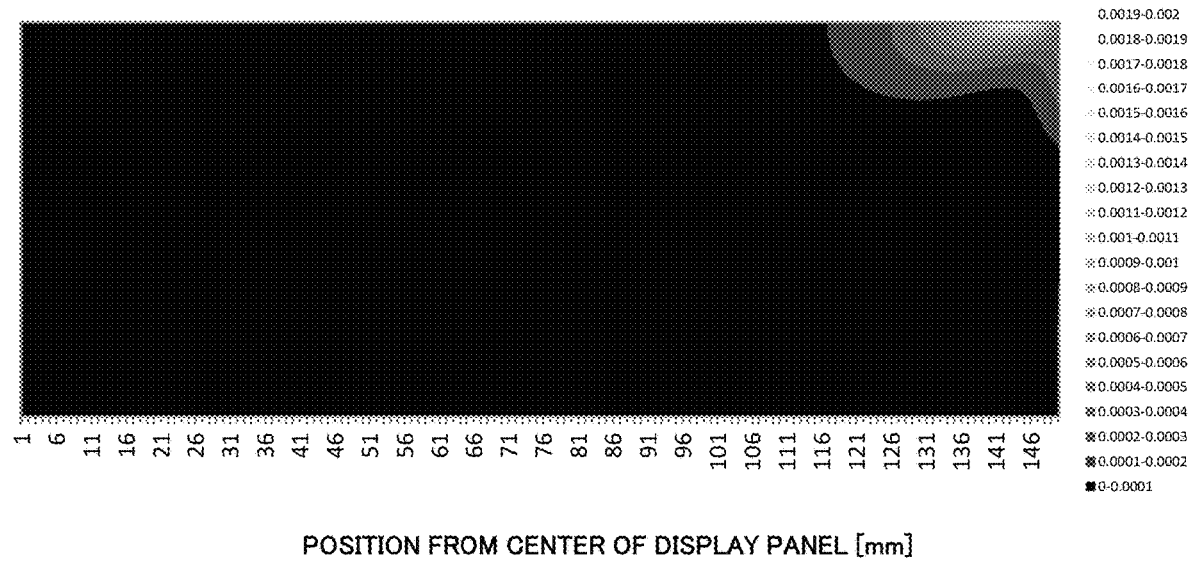
FIG. 14 is a view illustrating the light transmittance distribution in the curved surface display of the comparative example.

FIG. 14 illustrates the light transmittance distribution in the case that widths W1 of first sealing section 61 and third sealing section 62 and widths W2 of second sealing section 63 and fourth sealing section 64 are set to 3.0 mm in the curved display of the comparative example (W1=W2=3.0 mm). FIG. 14 illustrates a measurement result of the light transmittance in the region from the center of the display screen to the upper right of the display screen in the curved display that is bent in the row direction while the curvature radius is set to 500 mm. At this point, the peak value of the transmittance was 0.001578, and the region where the transmittance was greater than or equal to 0.0005 was 47 mm². As illustrated in FIG. 14, although the transmittance is lower than that of the curved display of the comparative example in FIG. 8B in the vicinity of 141 mm from the center of the display screen, a degree of light leakage is not much changed compared with curved display 1 of the exemplary embodiment in FIG. 11.

In order to decrease the T/C misalignment amount to reduce the light leakage amount generated at the four corners of curved display 1, it is effective that width W1 of the sealing section extending in the direction orthogonal to the bending direction of the curved display, and it is understood that magnitude of width W2 of the sealing section extending in the direction parallel to the bending direction of the curved display has a relatively low influence. Like the exemplary embodiment, width W1 of the sealing section extending in the direction orthogonal to the bending direction of the curved display is increased, for example, width W1 is set to larger than width W2 of the sealing section extending in the direction parallel to the bending direction (W1>W2). Consequently, the T/C misalignment amount is decreased (see FIG. 12B), the stress on the glass substrate disperses to hardly generate stress concentration (see FIG. 13), and it is inferred that the light transmittance (light leakage amount) is lowered.

In curved display 1 of the exemplary embodiment, width W1 of the sealing section extending in the direction orthogonal to the bending direction of the curved display is relatively larger than width W2 of the sealing section extending in the direction parallel to the bending direction. Thus, an effective display region is widely ensured while the material cost is suppressed, and the light leakage generated in the vicinity of the four corners of the display screen can be decreased. In curved display 1, widths W2 of second sealing section 63 and fourth sealing section 64 range preferably from 0.7 mm to 1.1 mm. Widths W1 of first sealing section 61 and third sealing section 62 are preferably 1.1 to 5.0 times width W2.

A method for manufacturing curved display 1 of the exemplary embodiment will be described below. The process of manufacturing curved display 1 includes a TFT substrate manufacturing process, a CF substrate manufacturing process, a substrate bonding process, a polarizing plate adhesion process, a bending process, and a liquid crystal injecting process.

A known process for performing the configuration of the transverse electric field system (IPS system) can be applied in the TFT substrate manufacturing process. For example, a metal material constituting gate line 12 is deposited on the first surface of glass substrate 101 by sputtering, and patterned by photoetching. Consequently, gate line 12 is formed as a planar pattern. Subsequently, insulator 102 is stacked so as to cover gate line 12 by chemical vapor deposition CVD, and semiconductor layer 21 is stacked on insulator 102. A metal material constituting data line 11 is formed on semiconductor layer 21 by sputtering. Data line 11 and source electrode 23 are simultaneously formed using halftone exposure. Subsequently, insulator 103 is stacked by CVD so as to cover data line 11 and source electrode 23. Subsequently, common electrode 16 is formed by photoetching after ITO is deposited on insulator 103. Subsequently, insulator 104 is formed by CVD so as to cover common electrode 16. Insulator 103 and insulator 104 are dry-etched to form through-hole 24 reaching source electrode 23. Pixel electrode 15 is formed by photoetching after ITO is formed on insulator 104 and in through-hole 24 by sputtering. Pixel electrode 15 is processed into a pattern having a slit. A part of pixel electrode 15 is directly formed on source electrode 23. Consequently, pixel electrode 15 and source electrode 23 are electrically connected to each other.

In the CF substrate manufacturing process, for example, color filter 202 and black matrix 203 are formed on the first surface of glass substrate 201.

A process of applying the sealing material (sealing material 60) to TFT substrate 100 manufactured in the TFT substrate manufacturing process, an ODF process of dropping the liquid crystal material, and a process of aligning and bonding CF substrate 200 manufactured in the CF substrate manufacturing process with and to TFT substrate 100 to which the sealing material is applied, and a process of irradiating the sealing material with the light to cure the sealing material are performed in the substrate bonding process.

At this point, in the sealing material applying process, an application speed at time of applying the sealing material (first sealing section 61 and third sealing section 62) extending in the direction orthogonal to the bending direction of curved display 1 is set to slower than an application speed at time of applying the sealing material (second sealing section 63 and fourth sealing section 64) extending in the direction parallel to the bending direction. As another sealing material applying method, the number of times of applying the sealing materials (first sealing portion 61 and third sealing portion 62) extending in the direction orthogonal to the bending direction of curved display 1 is set larger than the number of times of applying the sealing material (second sealing section 63 and fourth sealing section 64) extending in the direction parallel to the bending direction. Consequently, widths W1 of first sealing section 61 and third sealing section 62 can be increased larger than widths W2 of second sealing section 63 and fourth sealing section 64. The sealing material applying method is not limited to the above method, any sealing material applying method satisfying W1>W2 may be adopted.

In the polarizing plate adhesion process, polarizing plate 106 adheres onto the second surface of glass substrate 101 on the opposite side to the first surface of glass substrate 101, and polarizing plate 206 adheres onto the second surface of glass substrate 201 on the opposite side to the first surface of glass substrate 201.

In the bending process, TFT substrate 100 and CF substrate 200 bonded together are bent in a desired uniaxial direction (for example, the row direction or the column direction). The bending method is not limited, but a jig may be used, or a heat shrinkable film may be used.

Then, curved display 1 is completed through a process of assembling the backlight device and an inspection process.

In the above description, the transverse electric field system (IPS system) curved display is cited as an example, but the present disclosure is not limited to the curved display of the transverse electric field system. The configuration of sealing material 60 and the method for applying the sealing material 60 can also be applied to various curved displays such as a curved display other than the transverse electric field system.

Curved display 1 of the present disclosure can be used in various electronic devices such as a medical device and an on-vehicle device in addition to a television set and a smartphone. A case where the curved display 1 of the present disclosure is used as the on-vehicle device will be described in detail below.

Figure 15:
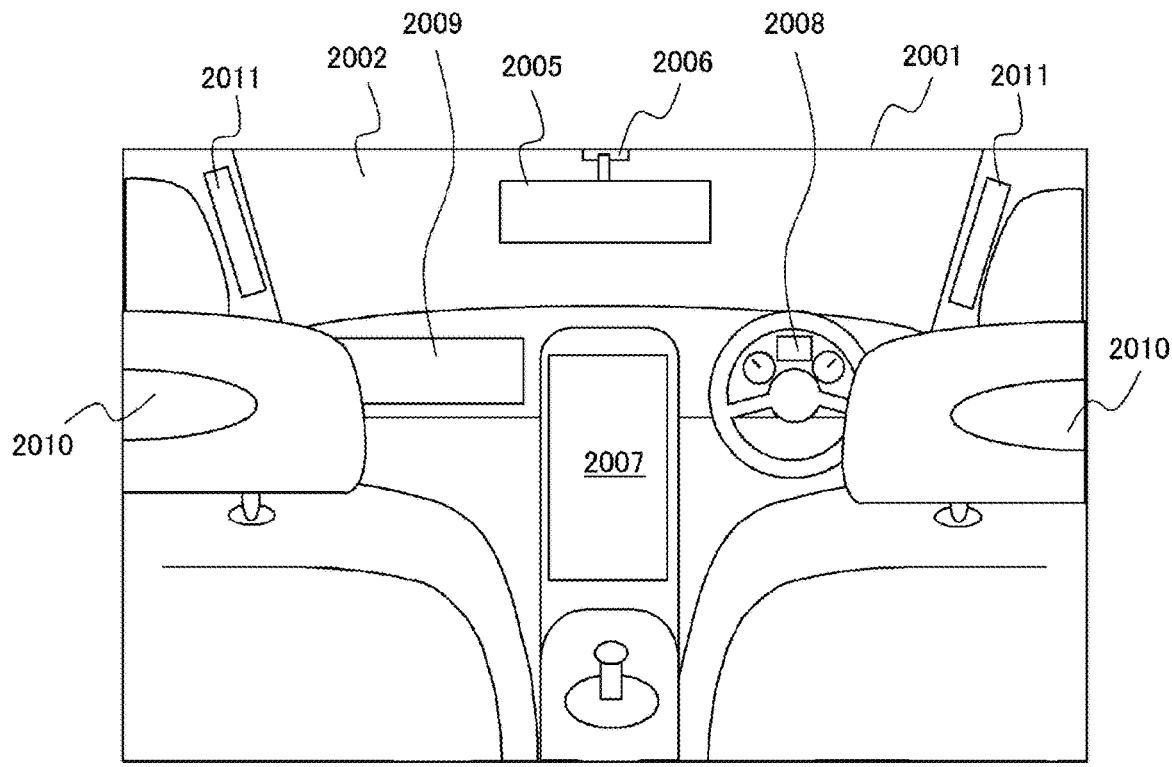
FIG. 15 is a schematic view illustrating an example in which an on-vehicle device provided with the curved surface display in FIG. 1 is mounted on a vehicle.

FIG. 15 is a schematic diagram illustrating an example in which the on-vehicle device equipped with curved display 1 is mounted on vehicle 2001. As illustrated in FIG. 15, the on-vehicle device of the present disclosure can be used as electronic mirror device 2005, center information display (hereinafter, abbreviated as CID) 2007, and cluster portion 2008, in which exterior or interior information on vehicle 2001 can be projected. These on-vehicle devices effectively assist safe driving of a driver. Electronic mirror device 2005 is incorporated in vehicle compartment 2002 through attaching portion 2006. The on-vehicle device of the present disclosure can also be used as front passenger seat display 2009 and rear passenger seat display 2010. A person other than the driver effectively assists the safe driving of the driver using these on-vehicle devices. The on-vehicle device of the present disclosure can also be used as wide-view angle ensuring display 2011 that is disposed in a pillar located between a front glass and a side glass. A blind angle of the driver may occur at the pillar. The safe driving of the driver can be assisted if the exterior information corresponding to the blind angle is projected to the pillar. Therefore, wide-view angle ensuring display 2011 is preferably disposed in the pillar in order to project the exterior information on the vehicle. There is no particular limitation to the use of on-vehicle device as long as on-vehicle device is mounted on vehicle 2001 to display the video.

Figure 16:
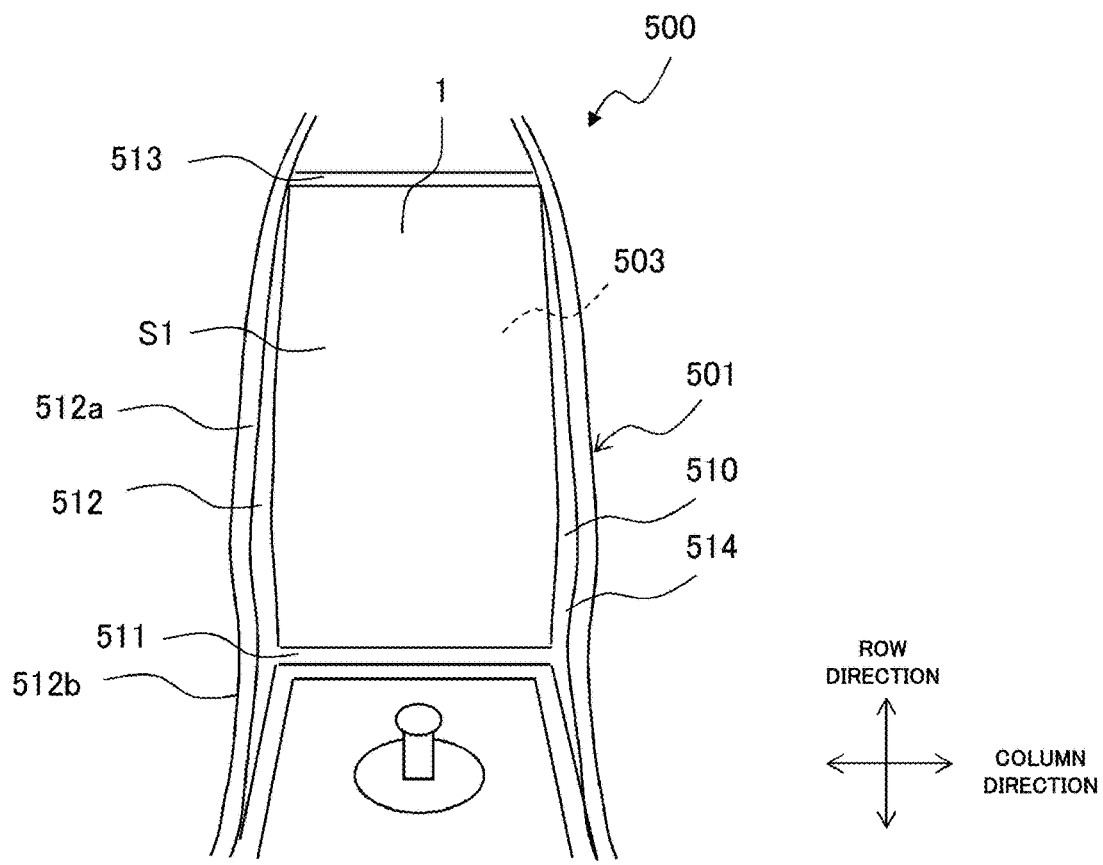
FIG. 16 is a front view illustrating an example in which the on-vehicle device is used as a CID.

FIG. 16 illustrates an example in which on-vehicle device 500 is used as CID 2007. At this point, FIG. 16 is a front view of on-vehicle device 500. As illustrated in FIG. 16, on-vehicle device 500 includes main body component 501 and curved display 1 held by main body component 501. Main body component 501 is a component used to attach curved display 1 to vehicle 2001, and is also called a housing or a chassis. Main body component 501 includes frame body 510 disposed in a periphery of curved display 1, and display surface S1 that displays the video of curved display 1 is exposed from opening 503 surrounded by frame body 510.

As illustrated in FIG. 16, frame body 510 of main body component 501 includes first frame edge 511 and third frame edge 513 (extending in the column direction (second direction)), which are disposed opposite the row direction (bending direction, the first direction), and second frame edge 512 and fourth frame edge 514 (extending in the row direction (first direction)), which are disposed opposite the column direction. As can be seen from FIG. 18 (to be described later), first frame edge 511 corresponds to first sealing section 61 at a peripheral edge of curved display 1, more particularly first frame edge 511 is located along first sealing section 61, second frame edge 512 corresponds to second sealing section 63 at the peripheral edge of curved display 1, more particularly second frame edge 512 is located along second sealing section 63, third frame edge 513 corresponds to third sealing section 62 at the peripheral edge of curved display 1, more particularly third frame edge 513 is located along third sealing section 62, and fourth frame edge 514 corresponds to fourth sealing section 64 at the peripheral edge of curved display 1, more particularly fourth frame edge 514 is located along fourth sealing section 64.

Figure 17:
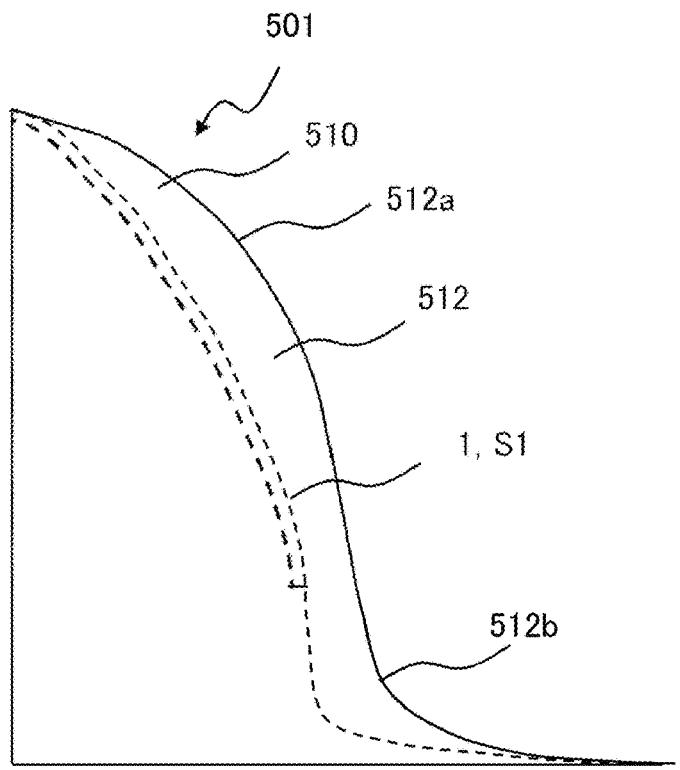
FIG. 17 is a side view illustrating the on-vehicle device in FIG. 16.

FIG. 17 is a side view of on-vehicle device 500. As illustrated in FIG. 17, the second frame edge 512 includes first bending region 512a curved in the row direction (first direction) so as to protrude toward the same direction as curved display 1. In the example of FIG. 17, because curved display 1 is curved such that a portion located at the center in the row direction is convex from the rear surface side toward the display surface side, first bending region 512a is also curved such that the portion located at the center in the row direction is convex from the rear surface side toward the display surface side. In such a configuration, a foreign substance or dust invades from a boundary between curved display 1 and frame body 510 can be reduced because at least a part of frame body 510 disposed at the peripheral edge of curved display 1 is curved along curved display 1.

As can be seen from FIG. 17, first bending region 512a is located in a region between first sealing section 61 and third sealing section 62 in the row direction (first direction).

Second frame edge 512 includes second bending region 512b disposed closer to first sealing section 61 than to first bending region 512a. Second bending region 512b is curved in the row direction (first direction) so as to protrude in the opposite direction to first bending region 512a. That is, second bending region 512b is curved such that a portion located at the center in the row direction is convex from the display surface side toward the rear surface side.

Figure 18:
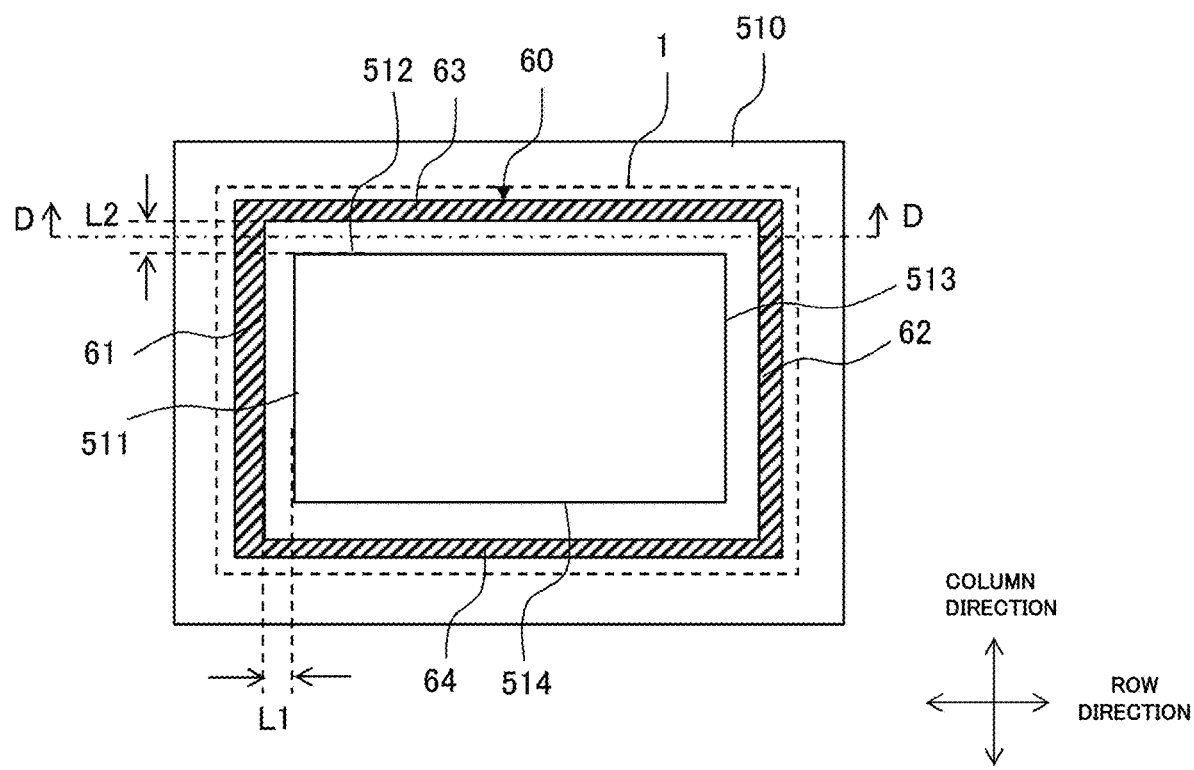
FIG. 18 is a plan view illustrating a sealing material and a frame body in the curved surface display.
Figure 19:
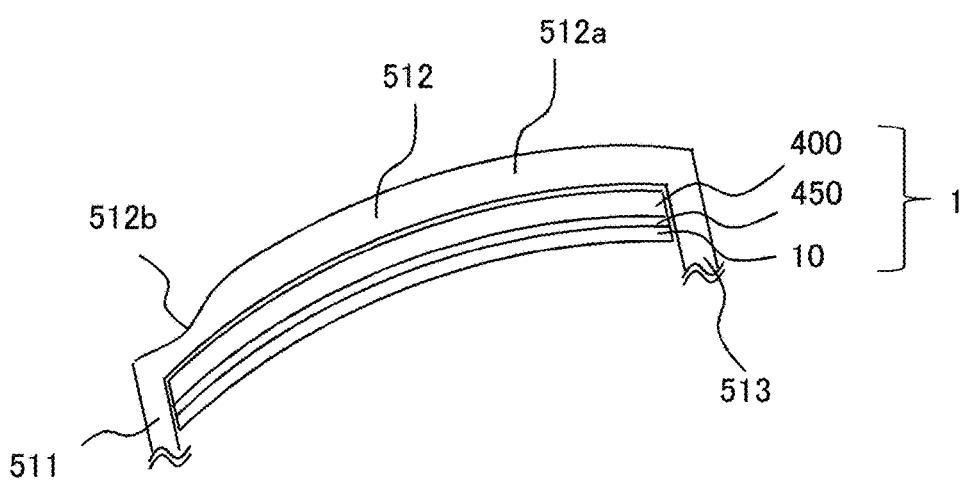
FIG. 19 is a sectional view taken along a line D-D in FIG. 18.

FIG. 18 is a plan view illustrating sealing material 60 in curved display 1 and frame body 510. FIG. 19 is a sectional view taken along a line D-D in FIG. 18. As illustrated in FIGS. 18 and 19, each of first frame edge 511, second frame edge 512, third frame edge 513, and fourth frame edge 514 covers a part of the peripheral edge region of curved display 1 in planar view. In particular, first frame edge 511 overlaps first sealing section 61 in planar view, second frame edge 512 overlaps second sealing section 63 in planar view, and third frame edge 513 overlaps third sealing section 62 in planar view, and fourth frame edge 514 overlaps fourth sealing section 64 in planar view. Frame edges 511 to 514 overlap corresponding sealing sections 61 to 64 in planar view, which allows the light leakage that can be generated from the four corners of curved display 1 to be inconspicuous.

In the example of FIG. 18, first frame edge 511 protrudes onto a central side of curved display 1 beyond first sealing section 61 in planar view, and second frame edge 512 protrudes onto the central side of curved display 1 beyond second sealing section 63 in planar view. Length L2 of second frame edge 512 protruding from second sealing section 63 in planar view is longer than length L1 of first frame edge 511 protruding from first sealing section 61 in planar view.

FIG. 19 illustrates a layer configuration of curved display 1. As illustrated in FIG. 19, curved display 1 includes front plate 400 molded into a curved shape, and display panel 10 is bonded to front plate 400 with bonding agent 450 interposed therebetween. According to such a configuration, front plate 400 can hold display panel 10 while display panel 10 is curved.

Figure 20:
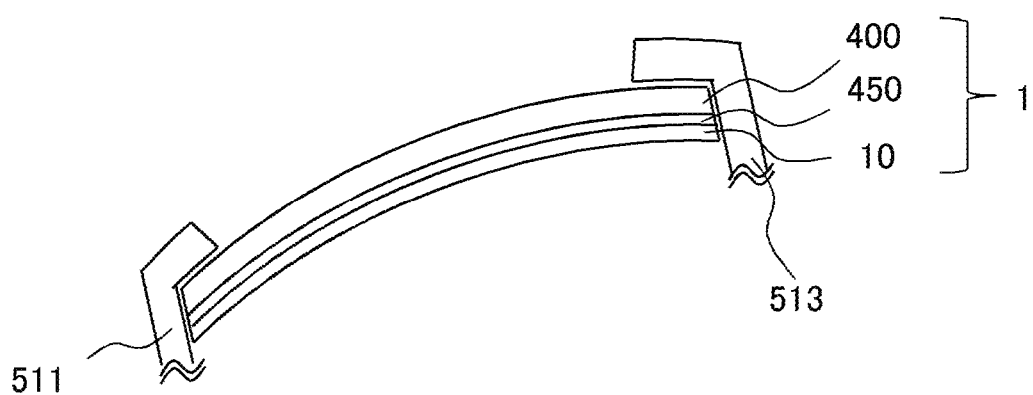
FIG. 20 is a sectional view illustrating a modification of the frame body in a section corresponding to FIG. 19.

FIG. 20 illustrates a modification of FIG. 19, and illustrates the case that second frame edge 512 is not provided in frame 510. In the example of FIG. 20, frame body 510 of main body component 501 includes first frame edge 511 located along first sealing section 61 at the peripheral edge of curved display 1 and third frame portion 513 located along third sealing section 62 at the peripheral edge of curved display 1. First frame edge 511 overlaps first sealing section 61 in planar view, and third frame edge 513 overlaps third sealing section 62 in planar view.

Figure 21:
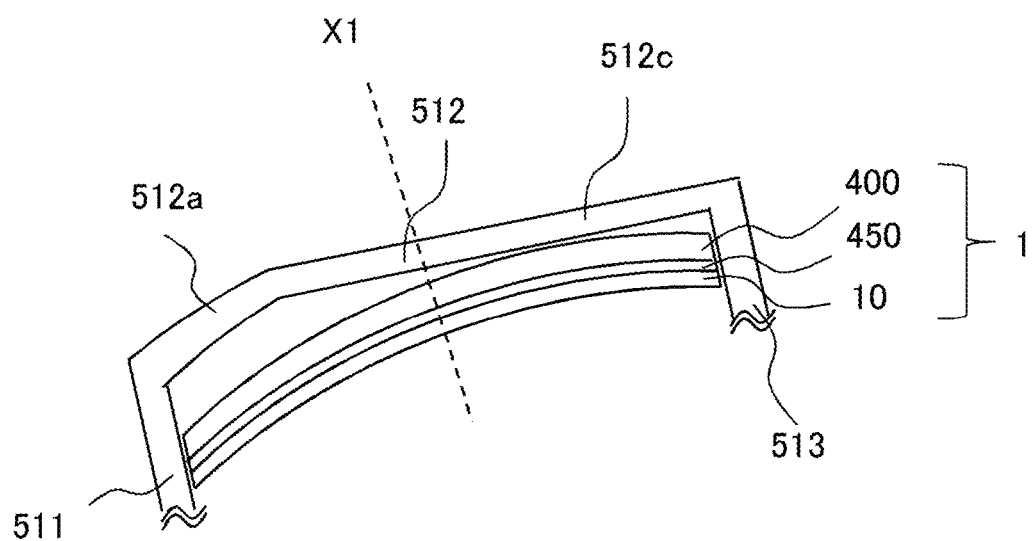
FIG. 21 is a sectional view illustrating a modification of disposition of a first bending region in the section corresponding to FIG. 19.

FIG. 21 illustrates a modification of the disposition of first bending region 512a in a section corresponding to FIG. 19. In the example of FIG. 21, second frame edge 512 includes first bending region 512a and flat region 512c disposed in a region separated farther away from first sealing section 61 than first bending region 512a. First bending region 512a is located closer to first sealing section 61 than to center X1 of curved display 1. More particularly, first bending region 512a is located away from first sealing section 61 by a distance smaller than a half of a distance from first sealing section 61 to center X1 of curved display 1. Also in the example of FIG. 21, similarly to the example of FIG. 17, second frame edge 512 further includes second bending region 512b, and second bending region 512b may be disposed farther away from the display side than first bending area 512a.

Figure 22:
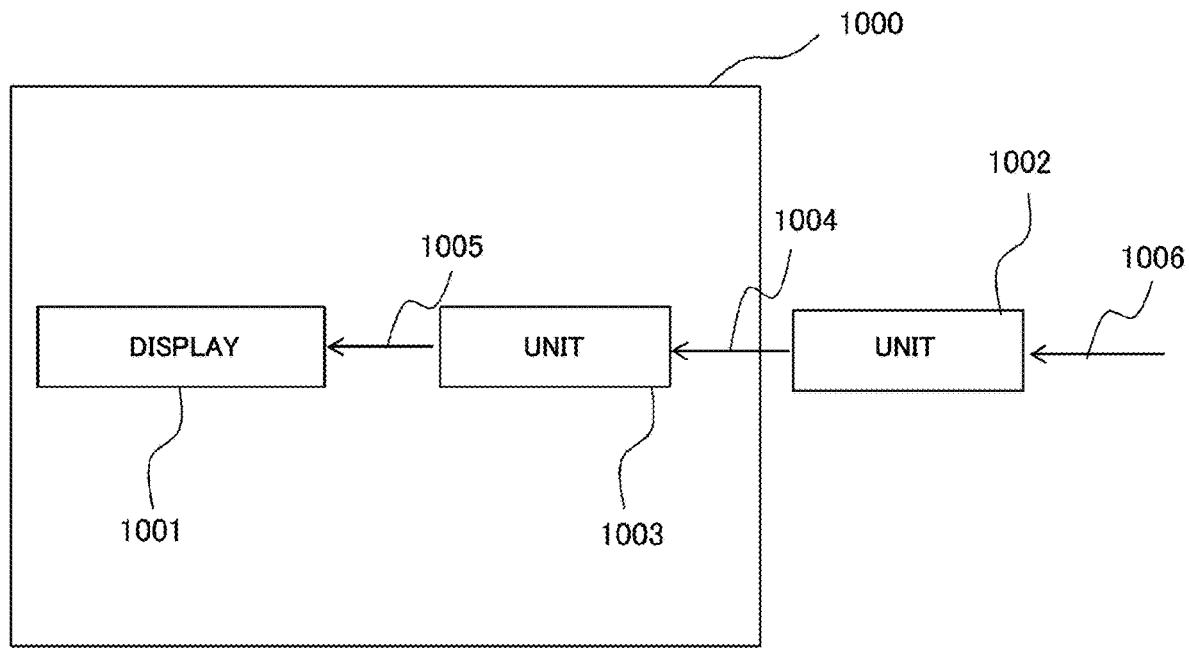
FIG. 22 is a block diagram illustrating another application example of the curved surface display.
Figure 23:
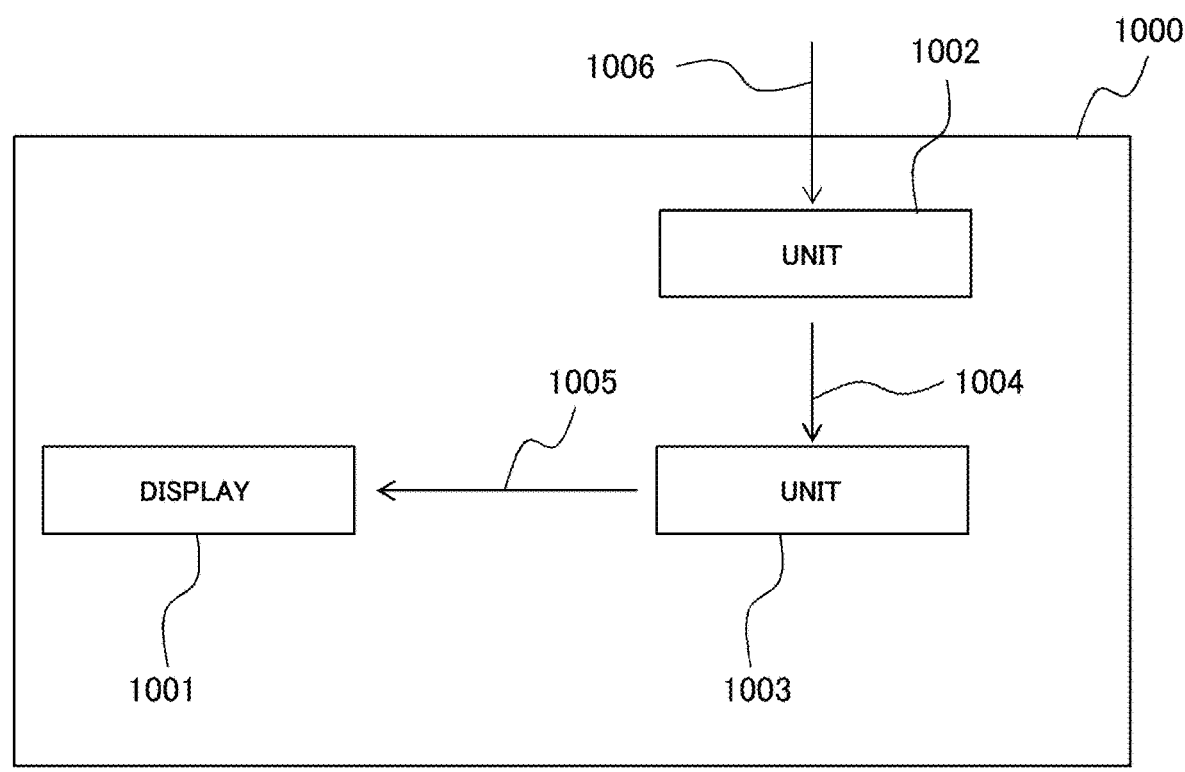
FIG. 23 is a block diagram illustrating still another application example of the curved surface display.

FIG. 22 is a block diagram illustrating another application example of curved display 1, and FIG. 23 is a block diagram illustrating still another application example of curved display 1. As illustrated in FIGS. 22 and 23, on-vehicle device 1000 of the application example includes curved display 1001 of the present disclosure, unit 1002 that receives information 1006 about the outside of the vehicle or the inside of the vehicle as first signal 1004, and unit 1003 that converts first signal 1004 into second signal 1005, and unit 1003 can transmit second signal 1005 to curved display 1001. On-vehicle device 1000 may include at least curved display 1001 of the present disclosure and unit 1003 that transmits second signal 1005 relating to information 1006 about the outside of the vehicle or the inside of the vehicle to curved display 1001. More specifically, on-vehicle device 1000 includes curved display 1 and unit 1003 that converts first signal 1004 as the information 1006 about the outside of the vehicle or the inside of the vehicle into second signal 1005, unit 1003 can be transmit second signal 1005 to curved display 1, curved display 1 includes first substrate 100 bent in the first direction, second substrate 200 that is bent in the first direction while disposed opposite first substrate 100, and sealing material 60 bonding first substrate 100 and second substrate 200 together, the sealing material 60 includes first sealing section 61 extending in the second direction orthogonal to the first direction and second sealing section 63 extending in the first direction, and the dimension in the first direction of first sealing section 61 is larger than the dimension in the second direction of second sealing section 63. Unit 1002 may be configured as a component different from on-vehicle device 1000 as illustrated in FIG. 22, or configured as a part of on-vehicle device 1000 as illustrated in FIG. 23.

At this point, information 1006 about the outside of the vehicle is positional information (distance information or direction information from the own vehicle to a person or an object located in front of or behind the vehicle) relating to a person or an object located in front of or behind the vehicle. Alternatively, the information about the outside of the vehicle is natural information such as temperature, humidity, a wind speed, and a wind direction.

Information 1006 about the inside of the vehicle is positional information about a person or an object located in the vehicle (distance information or direction information from a certain position to a person or an object located in the vehicle). Alternatively, the information about the inside of the vehicle is natural information such as temperature or humidity inside the car.

Various sensors such as a temperature sensor, a humidity sensor, a pressure sensor, an infrared sensor, a TOF (Time of Flight) sensor, an image sensor, an angular velocity sensor, and an acceleration sensor can be applied as unit 1002.

A unit that can convert analog information into digital information, a unit that can convert the digital information into the analog information, a unit that can convert the digital information into another piece of digital information, and an amplifier circuit can be considered as unit 1003. As to a method for converting the digital information into another piece of digital information, for example, for the information about the temperature, unit 1002 that functions as the temperature sensor detects the temperature as the digital information, and then the digital information is converted into digital information projecting the detected digital information as a numeral onto the curved display.

In the above, the specific embodiments of the present application have been described, but the present application is not limited to the above-mentioned embodiments, and various modifications may be made as appropriate without departing from the spirit of the present application.

What is claimed is:

1. An on-vehicle device comprising:
   a curved surface display; and
   a main body component that attaches the curved surface display to a vehicle, the main body component including a frame body disposed at a peripheral edge of the curved surface display, wherein
   the curved surface display includes:
      a first substrate that is curved such that a portion located at a center in a first direction is convex or concave toward a display surface side compared with portions located at both ends in the first direction;
      a second substrate that is curved along the first substrate while opposite the first substrate; and
      a sealing material that bonds the first substrate and the second substrate together, wherein
         the sealing material includes a first sealing section extending in a second direction crossing the first direction and a second sealing section extending in the first direction, wherein
         the frame body of the main body component includes a first frame edge located corresponding to the first sealing section at the peripheral edge of the curved surface display and a second frame edge located corresponding to the second sealing section at the peripheral edge of the curved surface display, and
         the second frame edge includes a first bending region that is curved in the first direction so as to protrude in a direction identical to the first substrate of the curved surface display, wherein
            the first frame edge protrudes onto a central side of the curved surface display beyond the first sealing section in planar view,
            the second frame edge protrudes onto the central side of the curved surface display beyond the second sealing section in planar view, and
            a length of a first portion of the second frame edge is longer than a length of a second portion of the first frame edge in the first direction,
               the first portion is a portion protruding from the second sealing section to the curved surface display in planar view, and the second portion is a portion protruding from the first sealing section to the curved surface display in planar view.

2. The on-vehicle device according to claim 1, wherein the dimension in the first direction of the first sealing section is 1.1 to 5.0 times the dimension in the second direction of the second sealing section.

3. The on-vehicle device according to claim 1, wherein the sealing material includes a third sealing section disposed away from the first sealing section in the first direction, and
   the first bending region is located in a region between the first sealing section and the third sealing section in the first direction.

4. The on-vehicle device according to claim 1, wherein the second frame edge overlaps the second sealing section in planar view.

5. The on-vehicle device according to claim 1, wherein the first frame edge overlaps the first sealing section in planar view.

6. The on-vehicle device according to claim 1, wherein the first bending region is located closer to the first sealing section than to a center of the curved surface display.

7. The on-vehicle device according to claim 1, wherein the first bending region is located away from the first sealing section by a distance smaller than a half of a distance from the first sealing section to a center of the curved surface display.

8. The on-vehicle device according to claim 1, wherein the second frame edge includes a second bending region disposed closer to the first sealing section than to the first bent region, and
   the second bending region is curved in the first direction so as to protrude in an opposite direction to the first bending region.

9. The on-vehicle device according to claim 1, wherein a dimension in the first direction of the first sealing section is larger than a dimension in the second direction of the second sealing section.

* * * * *